United States Patent
Ragan et al.

(10) Patent No.: US 11,198,568 B2
(45) Date of Patent: Dec. 14, 2021

(54) LINEAR-MOTOR CONVEYOR SYSTEM

(71) Applicant: Laitram, L.L.C., Harahan, LA (US)

(72) Inventors: Bryant G. Ragan, Metairie, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/069,375

(22) Filed: Oct. 13, 2020

(65) Prior Publication Data

US 2021/0024300 A1 Jan. 28, 2021

Related U.S. Application Data

(63) Continuation of application No. 16/337,539, filed as application No. PCT/US2017/054942 on Oct. 3, 2017, now Pat. No. 10,843,880.

(60) Provisional application No. 62/404,285, filed on Oct. 5, 2016, provisional application No. 62/483,043, filed on Apr. 7, 2017.

(51) Int. Cl.
*B65G 54/02* (2006.01)
*B65G 35/06* (2006.01)
*B65G 17/00* (2006.01)

(52) U.S. Cl.
CPC ........... *B65G 54/02* (2013.01); *B65G 17/002* (2013.01); *B65G 35/06* (2013.01); *B65G 2201/02* (2013.01)

(58) Field of Classification Search
None
See application file for complete search history.

(56) References Cited

U.S. PATENT DOCUMENTS

| | | | |
|---|---|---|---|
| 3,625,181 | A | 12/1971 | Weaver |
| 3,786,779 | A | 1/1974 | Brunel et al. |
| 3,803,466 | A | 4/1974 | Starkey |
| 3,806,979 | A | 4/1974 | Bonami |
| 4,061,089 | A | 12/1977 | Sawyer |
| 4,418,907 | A | 12/1983 | Shultz et al. |
| 4,917,228 | A | 4/1990 | Ichihashi |
| 5,086,729 | A | 2/1992 | Katagiri |
| 5,156,093 | A | 10/1992 | Azukizawa et al. |
| 5,299,662 | A | 4/1994 | Reddy et al. |

(Continued)

FOREIGN PATENT DOCUMENTS

| | | |
|---|---|---|
| CN | 103227552 A | 7/2013 |
| DE | 102013105430 A1 | 11/2014 |

(Continued)

OTHER PUBLICATIONS

Notice of Rejection, Japanese Application No. 2019-516166, dated Feb. 2, 2021, Japanese Patent Office.

(Continued)

*Primary Examiner* — Kavel Singh
(74) *Attorney, Agent, or Firm* — James T. Cronvich

(57) ABSTRACT

A tray conveyor in which plastic trays with rows of embedded translators are driven by stators in multiple conveyor sections. Washing stations in cleaning zones in each conveyor section are provided to automatically clean empty trays in the conveyor's return path. Indicia on each tray identify the tray as belonging to a specific family of trays. Each of the conveyor sections conveys only conveyor trays that belong to a predetermined family assigned to that conveyor section.

21 Claims, 26 Drawing Sheets

(56) References Cited

U.S. PATENT DOCUMENTS

| | | |
|---|---|---|
| 5,473,992 A | 12/1995 | Takei |
| 5,528,113 A | 6/1996 | Boys et al. |
| 5,542,356 A | 8/1996 | Richert et al. |
| 5,664,660 A | 9/1997 | Prydtz et al. |
| 5,886,432 A | 3/1999 | Markle |
| 5,965,963 A | 10/1999 | Chitayat |
| 5,994,798 A | 11/1999 | Chitayat |
| 6,101,952 A | 8/2000 | Thornton et al. |
| 6,208,045 B1 | 3/2001 | Hazelton et al. |
| 6,274,952 B1 | 8/2001 | Chitayat |
| 6,305,501 B1 | 10/2001 | Kahkipuro et al. |
| 6,397,990 B1 | 6/2002 | Brien et al. |
| 6,462,439 B1 | 10/2002 | Denne |
| 6,483,222 B2 | 11/2002 | Pelrine et al. |
| 6,499,701 B1 | 12/2002 | Thornton et al. |
| 6,531,793 B1 | 3/2003 | Frissen et al. |
| 6,578,495 B1 | 6/2003 | Yitts et al. |
| 6,580,185 B2 | 6/2003 | Kang et al. |
| 6,684,794 B2 | 2/2004 | Fiske et al. |
| 6,713,902 B2 | 3/2004 | Chitayat |
| 6,781,524 B1 | 8/2004 | Clark et al. |
| 6,803,681 B2 | 10/2004 | Faizullabhoy et al. |
| 6,879,063 B2 | 4/2005 | Frissen et al. |
| 6,917,136 B2 | 7/2005 | Thornton et al. |
| 6,983,701 B2 | 1/2006 | Thornton et al. |
| 7,134,258 B2 | 11/2006 | Kalany et al. |
| 7,448,327 B2 | 11/2008 | Thornton et al. |
| 7,458,454 B2 | 12/2008 | Mendenhall |
| 7,511,250 B2 | 3/2009 | Lindig |
| 7,781,993 B1 | 8/2010 | Faizullabhoy et al. |
| 7,926,644 B2 | 4/2011 | Mendenhall |
| 7,948,122 B2 | 5/2011 | Compter et al. |
| 8,074,578 B2 | 12/2011 | Thornton |
| 8,076,803 B2 | 12/2011 | Jacobs |
| 8,333,274 B1 | 12/2012 | Lykkegaard |
| 8,347,789 B2 | 1/2013 | Wolf et al. |
| 8,616,134 B2 | 12/2013 | King et al. |
| 8,863,669 B2 | 10/2014 | Young et al. |
| 8,967,051 B2 | 3/2015 | King et al. |
| 9,032,880 B2 | 5/2015 | King et al. |
| 9,045,183 B2 | 6/2015 | Laurence et al. |
| 9,150,116 B2 | 10/2015 | Matscheko et al. |
| 9,202,719 B2 | 12/2015 | Lu et al. |
| 9,260,210 B2 | 2/2016 | Jacobs et al. |
| 9,346,371 B2 | 5/2016 | King et al. |
| 9,611,107 B2 | 4/2017 | Wernersbach et al. |
| 9,685,849 B2 | 6/2017 | Lu et al. |
| 9,701,488 B2 | 7/2017 | Paweletz |
| 9,802,507 B2 | 10/2017 | Clark et al. |
| 10,273,095 B2 * | 4/2019 | Ragan ................. B08B 9/42 |
| 10,737,403 B2 * | 8/2020 | Bauer ................. B65G 47/682 |
| 2003/0217668 A1 | 11/2003 | Fiske et al. |
| 2006/0011093 A1 | 1/2006 | Jensen et al. |
| 2007/0283841 A1 | 12/2007 | Lopatinsky et al. |
| 2010/0236445 A1 | 9/2010 | King et al. |
| 2013/0008336 A1 | 1/2013 | Young et al. |
| 2013/0180824 A1 | 7/2013 | Kleinikkink et al. |
| 2015/0083018 A1 | 3/2015 | Clark et al. |
| 2015/0144462 A1 | 5/2015 | Weiss |
| 2015/0360581 A1 | 12/2015 | King et al. |
| 2016/0159585 A1 | 6/2016 | Wernersbach et al. |
| 2016/0194157 A1 | 7/2016 | Senn et al. |
| 2016/0325938 A1 | 11/2016 | King et al. |
| 2016/0380562 A1 | 12/2016 | Weber et al. |
| 2017/0050332 A1 | 2/2017 | Bauer et al. |
| 2017/0331359 A1 | 11/2017 | Paweletz et al. |
| 2018/0323732 A1 | 11/2018 | Weber et al. |
| 2019/0002214 A1 | 1/2019 | Weber |

FOREIGN PATENT DOCUMENTS

| | | |
|---|---|---|
| DE | 102014106400 A1 | 11/2015 |
| DE | 102014116232 A1 | 5/2016 |
| GB | 2133757 B | 1/1987 |
| JP | S5925572 A | 2/1984 |
| JP | H01312072 A | 12/1989 |
| JP | H02110023 A | 4/1990 |
| JP | H05213446 A | 8/1993 |
| JP | 2007200205 A | 8/2007 |
| WO | 2004/011351 A2 | 2/2004 |
| WO | 2009/083889 A1 | 7/2009 |
| WO | 2010/092473 A1 | 8/2010 |
| WO | 2015/036194 A1 | 3/2015 |
| WO | 2015/042409 A1 | 3/2015 |
| WO | 2015/162182 A1 | 10/2015 |
| WO | 2016/071062 A1 | 5/2016 |
| WO | 2016/096749 A1 | 6/2016 |
| WO | 2016/096850 A1 | 6/2016 |
| WO | 2016/096856 A1 | 6/2016 |
| WO | 2016/096910 A1 | 6/2016 |

OTHER PUBLICATIONS

Notice of Reasons for Refusal, Japanese Patent Application No. 2019-516166, dated Jun. 1, 2021, Japanese Patent Office.

* cited by examiner

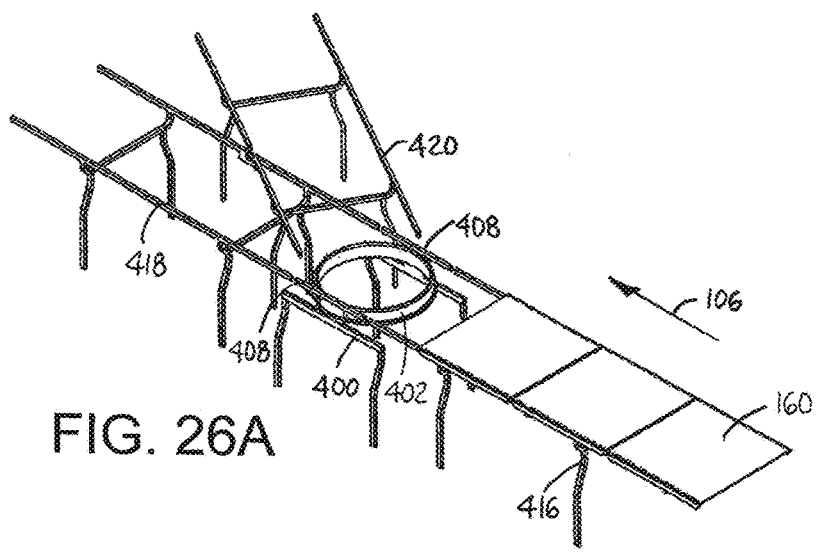
FIG. 26A
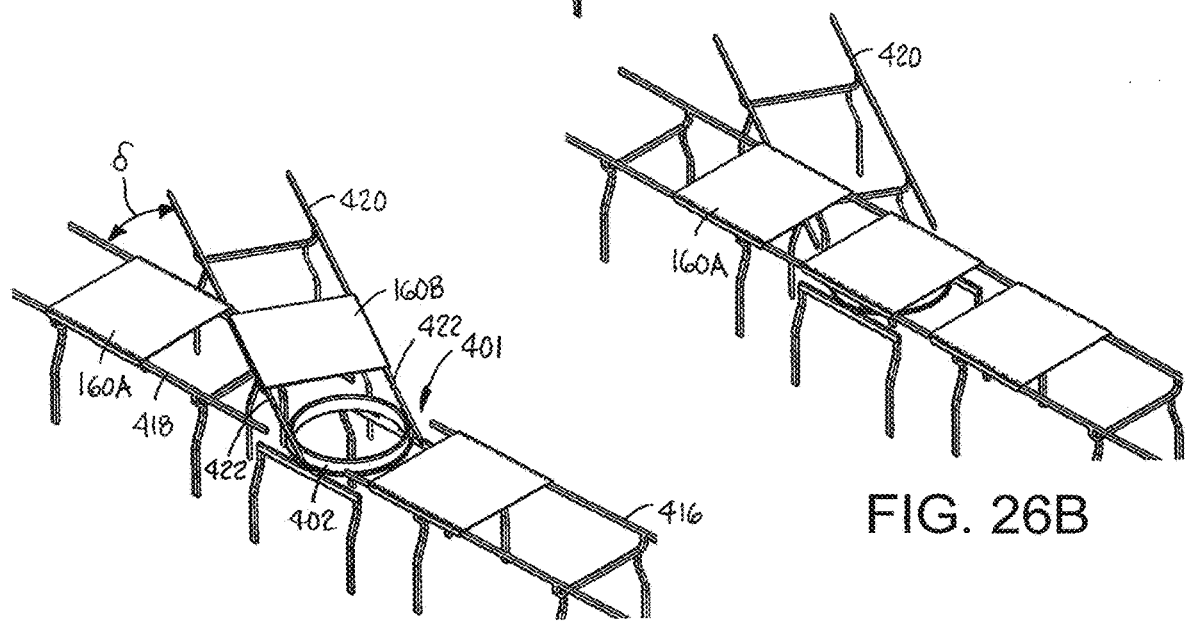
FIG. 26C
FIG. 26B
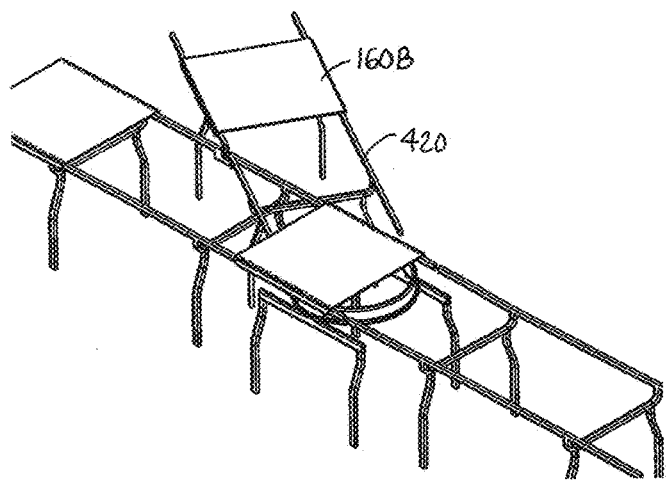
FIG. 26D

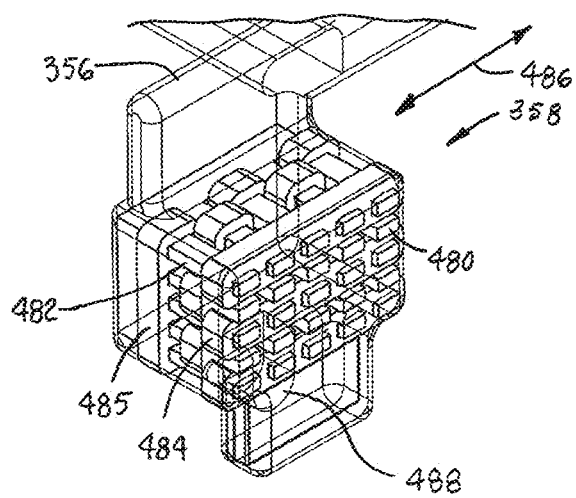
FIG. 31
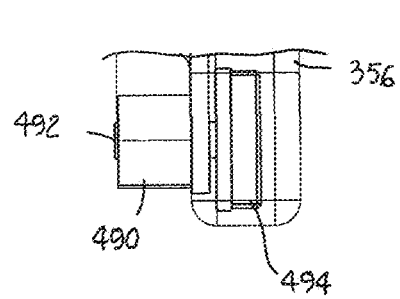 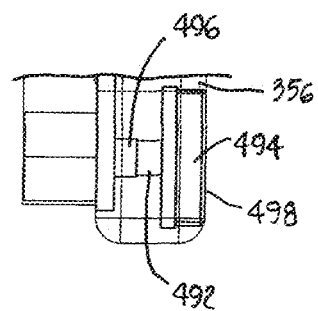
FIG. 32A  FIG. 32B

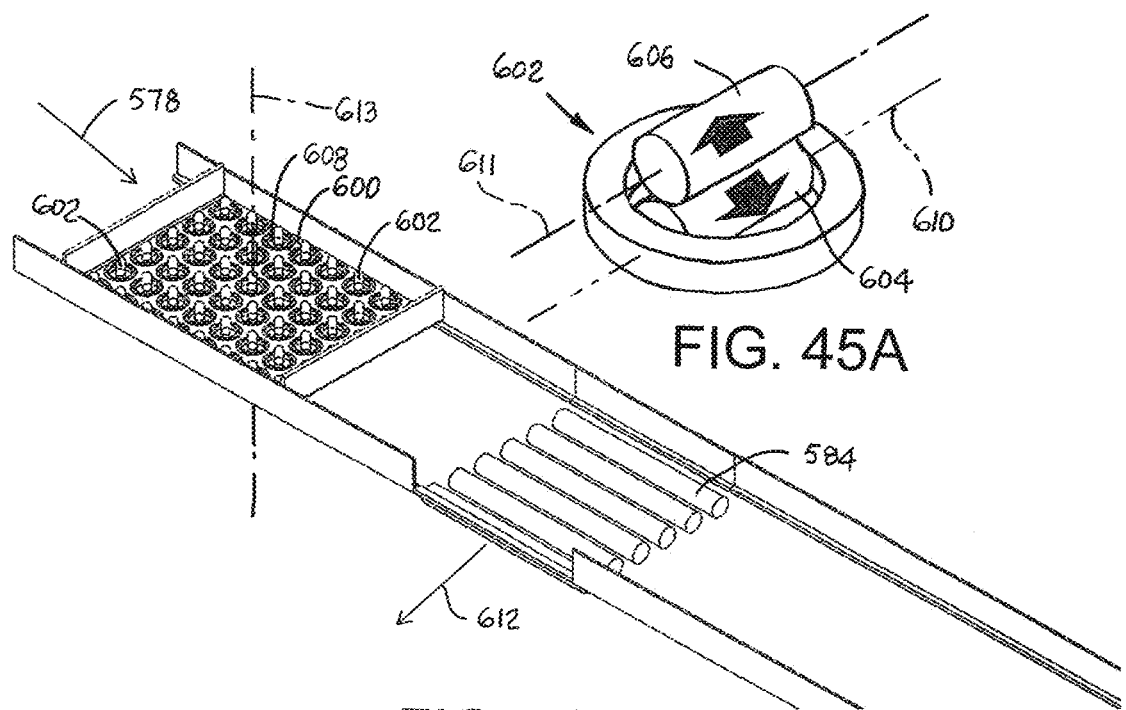
FIG. 45
FIG. 45A
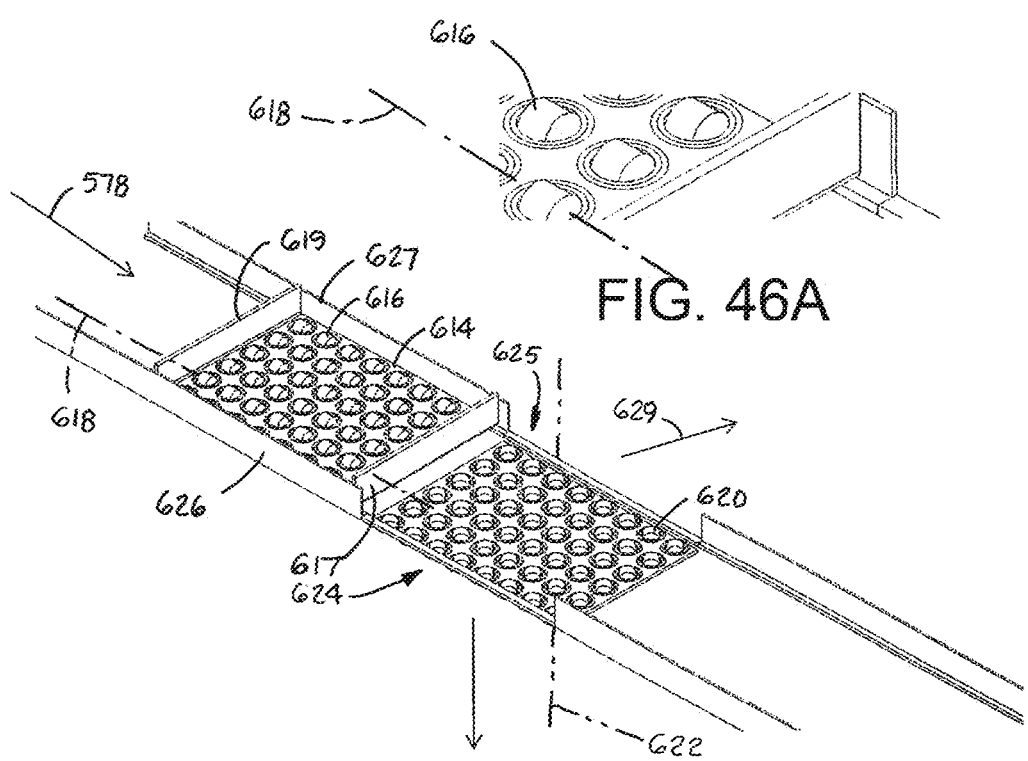
FIG. 46
FIG. 46A

LINEAR-MOTOR CONVEYOR SYSTEM

CROSS-REFERENCE TO RELATED APPLICATIONS

This application is a continuation of U.S. patent application Ser. No. 16/337,539, filed Mar. 28, 2019, which is a 371 of PCT/US2017/054942, filed Oct. 3, 2017, which claims the benefit of U.S. Provisional Patent Application No. 62/404,285, filed Oct. 5, 2016 and of U.S. Provisional Patent Application No. 62/483,043, filed Apr. 7, 2017. The disclosures of all those applications are incorporated by reference into this application.

BACKGROUND

The invention relates generally to power-driven conveyors and in particular to tray conveyors driven by linear motors.

Transport systems in which carriers driven by linear synchronous motors route individual carriers along various paths in a complex network of tracks are used to convey articles to selected destinations. An example of such a transport system is described in U.S. Pat. No. 8,967,051, "Transport System Powered by Short Block Linear Synchronous Motors and Switching Mechanism," to Nathanael N. King et al. of Magnemotion, Inc., Devens, Mass., U.S.A., Mar. 3, 2015. These systems work well, but are not so easy to clean. The housings of the linear-motor stators present large, flat, closed upper surfaces that collect grease and other food particles in food-processing applications. Unless properly cleaned, the surfaces can become contaminated with bacteria. And hard-to-access undercut surfaces in the transport system can harbor those bacteria.

SUMMARY

One version of a conveyor system embodying features of the invention comprises a plurality of conveyor sections. Each conveyor section comprises a tray guide that extends in length from a rear end to a front end and in width from a left side to a right side and at least one linear stator that extends in length through the tray guide between the rear end and the front end. Conveyor trays have at least one translator that form a linear motor with the at least one linear stator to drive the conveyor trays along the tray guide in the conveying direction. The conveyor sections are each arranged to form a carryway path along which the trays can carry articles and a return path along which empty trays return to the carryway path. The conveyor system comprises one or more cleaning zones along the return path for cleaning the trays.

Another version of a conveying system comprises a plurality of conveyor sections. Each conveyor section comprises a tray guide that extends in length from a rear end to a front end and in width from a left side to a right side and at least one linear stator that extends in length through the tray guide between the rear end and the front end. Conveyor trays each include at least one translator that forms a linear motor with the at least one linear stator to drive the conveyor trays along the tray guide in the conveying direction. Indicia on each conveyor tray indicate a family of which the conveyor tray is a member. The conveyor sections are arranged to form a carryway path along which the trays can carry articles and a return path along which empty trays return to the carryway path. Each of the conveyor sections conveys only conveyor trays that belong to a predetermined family.

A method embodying features of the invention for operating a conveyor comprises: (a) assigning each of a plurality of conveyor trays to one of a plurality of families by indicia indicating the assigned family; (b) assigning a predetermined family of conveyor trays to a conveyor; (c) identifying the assigned family of each conveyor tray on the conveyor; (d) identifying conveyor trays whose family does not match the predetermined family assigned to the conveyor; (e) preventing the conveyor trays whose family does not match the predetermined family assigned to the conveyor from being conveyed on the conveyor; and (f) conveying the conveyor trays whose family matches the predetermined family along the conveyor through a process.

BRIEF DESCRIPTION OF THE DRAWINGS

FIGS. 26A-26D are isometric views of a portion of a conveyor including a diverter as in FIG. 24;

FIG. 31 is an isometric view, partly in phantom, of a two-axis translator in the carriage of an elevator system as in FIGS. 20A-20C; and FIGS. 32A and 32B are side elevation views of a fail-safe braking system attached to the translator of FIG. 31 in non-braking and braking positions.

FIG. 45 is an isometric view of a diverting conveyor as in FIG. 43, but with stacked article-supporting roller sets, and FIG. 45A is an enlarged view of one of the stacked roller sets;

FIG. 46 is an isometric view of a bilateral diverting conveyor in which the conveyor tray has rollers selectively rotatable on axes parallel to the main conveying direction, and FIG. 46A is an enlarged view of a portion of the conveyor;

DETAILED DESCRIPTION

Figure 1:
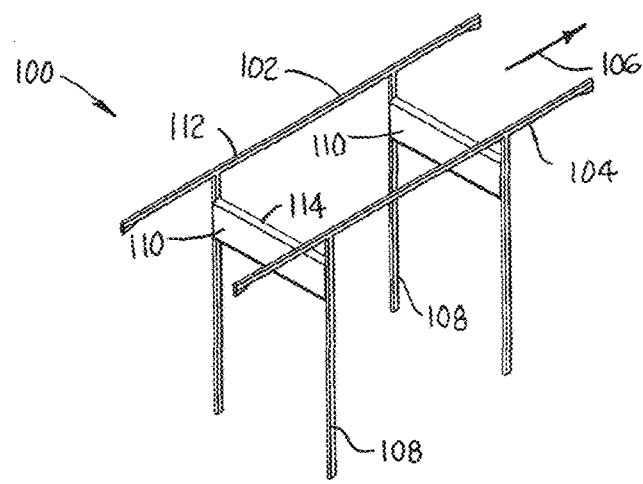
FIG. 1 is an isometric view of a conveyor segment of a linear-motor conveyor system embodying features of the invention.

A conveyor segment for constructing a cleanable conveyor system embodying features of the invention is shown in FIG. 1. The conveyor segment 100 comprises left and right side rails 102, 104 extending in length in a conveying direction 106. The two side rails are supported in a minimal conveyor frame comprising legs 108 and connecting structure in the form of cross beams 110 maintaining the two side rails 102, 104 parallel to each other. The entire conveyor frame is made of a plastic material, but could be made of other materials. Top surfaces 112 of the side rails 102, 104 and top surfaces 114 of the cross beams 110 are convexly curved, or rounded, to minimize the buildup of grease and contaminants.

Figure 2:
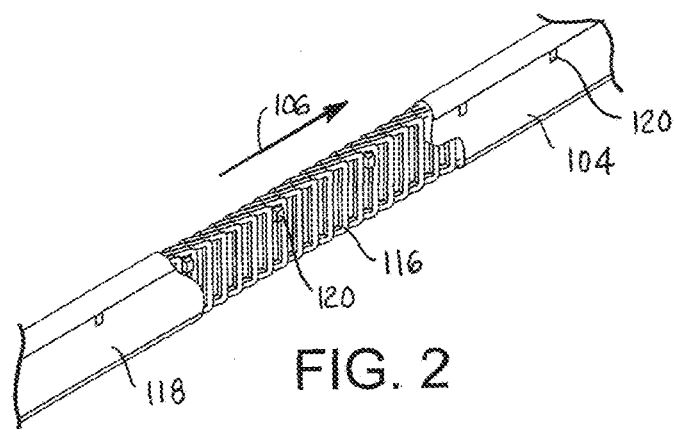
FIG. 2 is a partly cutaway enlarged view of a portion of the side rail of a conveyor segment as in FIG. 1.

As shown in FIG. 2, a three-phase linear-motor stator 116 is embedded in the right side rail 104. A similar stator is embedded in the left side rail. The stator 116 comprises a series of poles separated by slots in a linear core. Three-phase windings in the slots complete the stator. The core can be ironless to avoid the frictional effects of remanent magnetism when not energized. When energized, the stator 116 produces a magnetic flux wave that travels along the side rail 104 in or opposite to the conveying direction 106 shown. The magnetic flux wave is directed horizontally outward from the outer wall 118 of the side rail 104 in this example.

Also embedded in the side rail 104 are sensors 120 at spaced apart sensor positions along the side rail's length. Each sensor 120 is used to detect the presence of a tray on the side rails at the sensor position.

Figure 3:
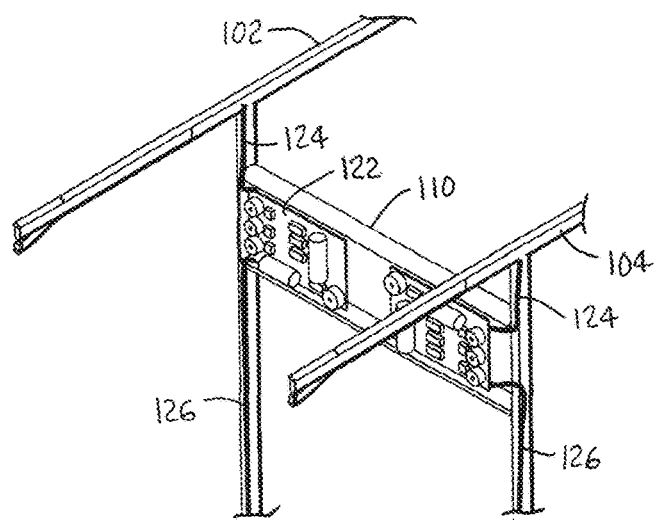
FIG. 3 is a partly cutaway isometric view of a conveyor segment as in FIG. 1 showing embedded electronic circuits and wiring.

The stators 116 and the sensors 120 are powered and controlled by electronic and power circuits 122 embedded in the cross beams 110 over wires 124 embedded in the conveyor frame and the side rails 102, 104 as shown in FIG. 3. Power, control, and data wires 126 connecting the electronics module 122 to a source of power and a system controller are embedded in the legs 108 of the conveyor frame. Because the wires, electronics, stators, and sensors are all encapsulated in the conveyor frame and side rails, the conveyor segment provides no flat surfaces or nooks and crannies that can collect and harbor contaminants. So the conveyor segment is easy to clean.

Figure 4:
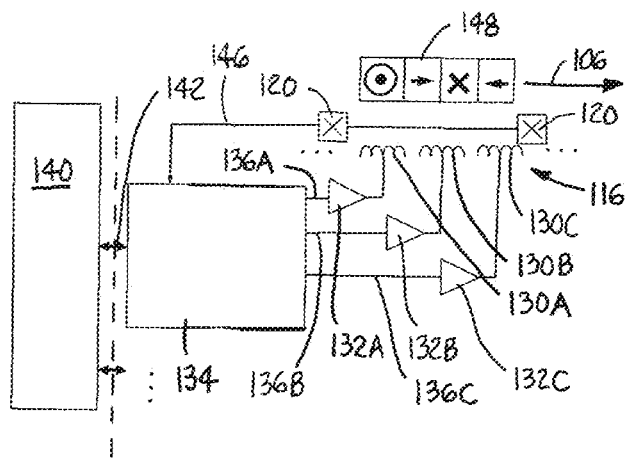
FIG. 4 is a block diagram of the electronic circuits of FIG. 3.

A block diagram of the electronics module and the stator drive is shown in FIG. 4. The stator 116 comprises a linear series of three sets of coils 130A, 130B, 130C—one set for each of the three phases—alternately arranged along the length of the side rail. Each set of coils 130A, 130B, 130C is driven by an amplifier 132A, 132B, 132C. The phasing sequence and frequency of the stator 116 are controlled through a stator drive control 134, which sends coil control signals 136A, 136B, 136C to the amplifiers 132A, 132B, 132C. The stator drive control 134 includes a computer in communication with a remote system computer 140, which also communicates with the stator drive controls in other conveyor segments. The stator drive control 134 receives commands from and sends data to the system computer 140 wirelessly or over a hard-wired connection 142. The sensors 120 send sensor signals 146 indicating the position of a conveyor tray over a sensor bus to the stator drive control 134, which uses those signals to determine when to energize and de-energize the stator 116. All those components, except for the remote system computer 140, are encapsulated in the conveyor frame as in FIG. 3. The magnetic flux wave produced by the stator in the rail causes a conveyor tray with an embedded permanent-magnet array 148 to advance along the rail in the conveying direction 106.

Figure 5:
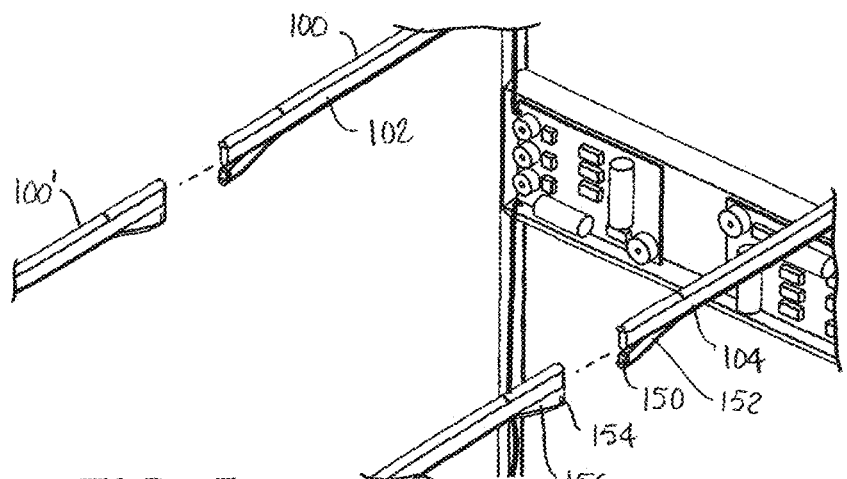
FIG. 5 is an isometric view of confronting end portions of two adjacent conveyor segments as in FIG. 1.

FIG. 5 illustrates how two adjacent conveyor segments 100, 100' are maintained with their left and right side rails 102, 104 aligned to form continuous rails. An alignment magnet 150 is embedded in the end of an appendage 152 at the bottom of each side rail 102, 104. A similar magnet 154 is embedded in a similar appendage 156 at the confronting end of the side rail of the adjacent conveyor segment 100'. The magnets 150, 154 are arranged with their opposite poles facing each other so that they attract. The attraction of the magnets keeps the confronting rails in alignment. Instead of having magnets in both confronting side-rail ends, one end could have a piece of ferrous material that would be attracted by the magnet in the adjacent conveyor segment to maintain alignment.

Figure 6:
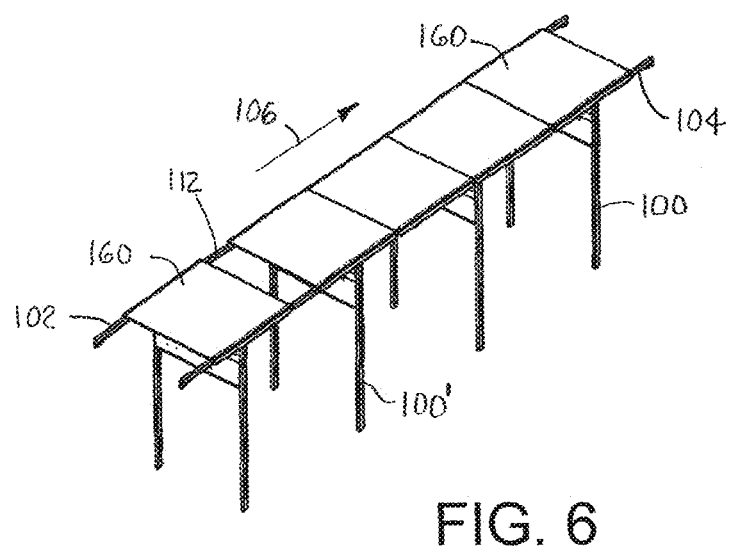
FIG. 6 is an isometric view of two joined conveyor segments as in FIG. 1.
Figure 7:
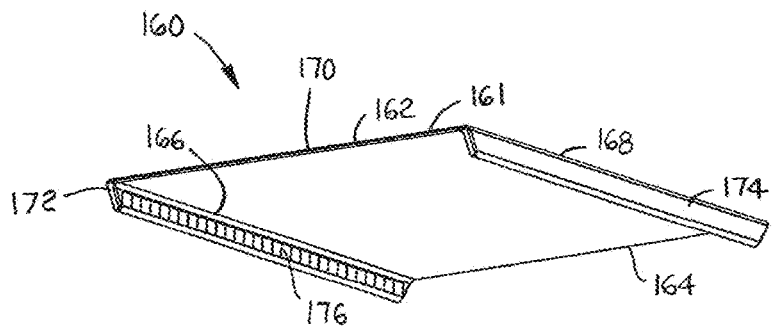
FIG. 7 is an isometric view of a conveyor tray usable with the conveyor segment of FIG. 1.

A short conveyor section constructed of two conveyor segments 100, 100' is shown in FIG. 6 supporting a series of conveyor trays 160 on the tops 112 of the side rails 102, 104, which serve as a tray guide. The trays 160 are not connected to each other and are independently movable in or opposite to the conveying direction 106 by the stators embedded in the side rails 102, 104. The trays 160 can be simply lifted from the conveyor segment for cleaning, maintenance, or other removal needs. And the trays can be replaced on the conveyor segment just as easily. As shown in FIG. 7, each tray 160 is shown as a rectangular tray body 161 with a rear edge 162, a front edge 164, a left edge 166, and a right edge 168. The tray 160 has an upper article-supporting surface 170 extending to the edges 162, 164, 166, 168. Skirts 172, 174 extend downward from the left and right edges 166, 168. Embedded in each skirt 172, 174 is an array of permanent magnets 176 extending in length along the skirt between the rear and front edges 162, 164. The magnet arrays are arranged with their magnetic fields directed generally parallel to the article-supporting surface 170 to maximize the magnetic coupling with the traveling magnetic wave produced by the stators in the side rails of the conveyor segments. The skirts 172, 174 overlap the conveyor side rails and help keep the trays 160 laterally in place. At least the skirts 172, 174 are made of a non-magnetic material, such as plastic. And the upper article-supporting surface 170 can be continuous or foraminous, flat or curved, and smooth or textured with nubs, cones, diamonds, or other patterns. Furthermore, the conveyor tray could have left, right, front, and rear sides standing up from the left, right, front, and rear edges for use as, for example, a baking pan. The article-supporting surface 170 could extend beyond the front, rear, left, and right edges of the main tray body.

Figure 58:
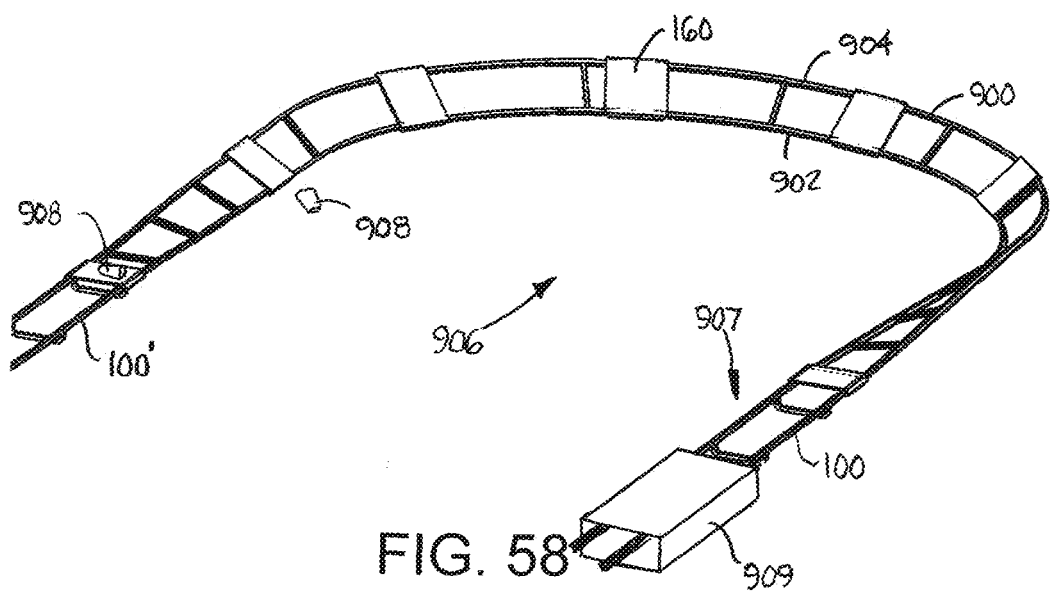
FIG. 58 is an isometric view of a racetrack portion of a conveyor section made of conveyor segments as in FIG. 1, but curved.

Straight conveyor segments 100, 100' as in FIG. 6 can be joined to curved conveyor segments 900 as in FIG. 58 to form a banked racetrack conveyor section 906. The side rails 902, 904 of the curved segments 900 are curved out of coplanarity with the straight segments to form the banked racetrack section 906. Articles 908 carried on the conveyor trays 160 are diverted off the trays 160 and over the lower side rail 902 upon entering the banked racetrack section 906. In this way the racetrack serves as a tilt conveyor to allow conveyed products to drop from the trays in the banked section 906. The banked racetrack section 906 also permits the construction an endless track without a lower returnway along its entire circuit. And the trays 160 are shown routed through a washing station including a cleaning zone containing an automatic washing enclosure 909 like that used in car washes along a return section 907 downstream of the banked section 906. Washing the trays 160 in the automatic washing enclosure 909 in the return 907 reduces or eliminates the manual washing of the trays and, thus, increases productivity and ensures consistent tray hygiene.

Figure 8:
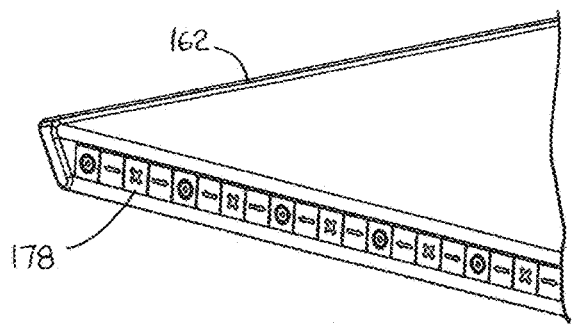
FIG. 8 is an isometric view of a portion of a conveyor tray as in FIG. 7 with a Halbach magnet array.
Figure 54:
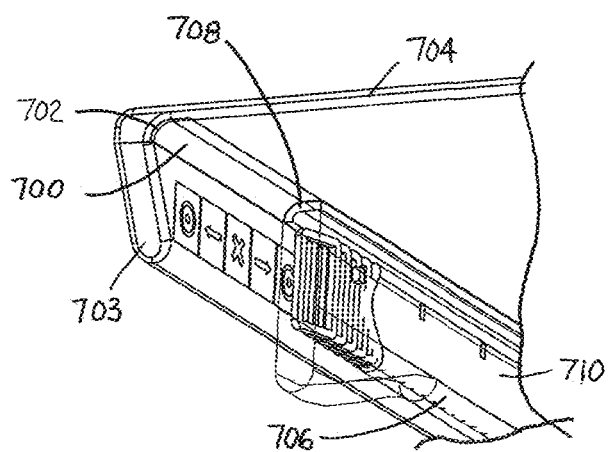
FIG. 54 is an isometric view of an underside corner of a carriage tray as in FIG. 7 with a magnetic strip interacting with a conductive strip in a conveyor rail as in FIG. 3.

For even better magnetic coupling, the permanent-magnet arrays can be arranged as Halbach arrays 178 with the magnets arranged in alternating polarities as shown in FIG. 8. Each magnet array, whether Halbach or not, forms the secondary of a magnetic circuit whose primary is the stator in a side rail. When the secondaries are permanent magnet arrays, they form a linear synchronous motor with the stators. The magnet array in the tray could be replaced with electrically conductive material in which the magnetic flux wave produced by the stator induces eddy currents. The eddy currents produce a secondary magnetic field that interacts with the stator's primary magnetic field, i.e., the traveling magnetic flux wave, to generate a propulsive force to move the tray along the rail. When electrically conductive material is used instead of magnets in the tray, the electrically conductive material forms a linear induction motor with the stator. As another alternative, the tray could have a platen including a linear array of pole faces with three-phase windings with a different pole pitch from that of the three-phase stator poles on a stator platen to form a linear reluctance motor. Whether linear synchronous, induction, or reluctance motors are formed, the secondaries in the trays are referred to in this description and in the claims as translators—analogous to rotors in a standard rotating motor. And, as shown in FIG. 54, the trays could include magnetic strips 700 extending along their undersides in the joints 702 between the skirts 703 and the bottom of the article-supporting surface 704. As the trays advance along a conveyor segment 706, the magnetic fields of the magnetic strips 700 induce currents in electrically conductive strips 708 embedded in and extending the length of stator rails 710. The induced currents create induced magnetic fields that interact with the magnetic fields of the magnets to produce a levitation force acting upward and outward on the trays for low-friction, levitated travel.

Figure 9:
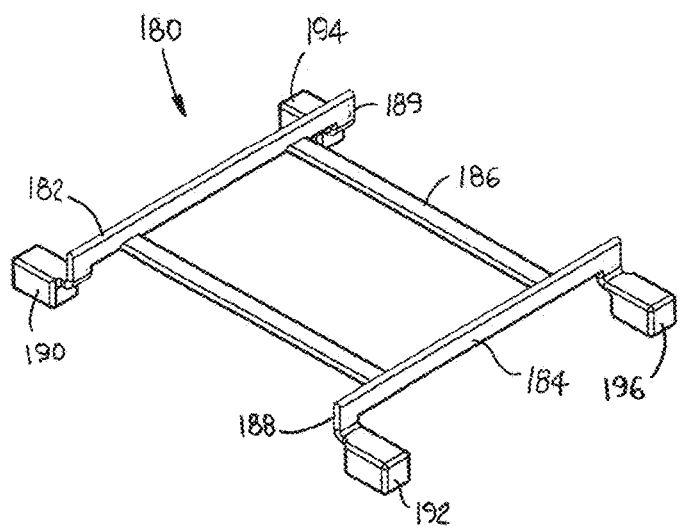
FIG. 9 is an isometric view of a carriage usable with a conveyor segment as in FIG. 1.
Figure 10:
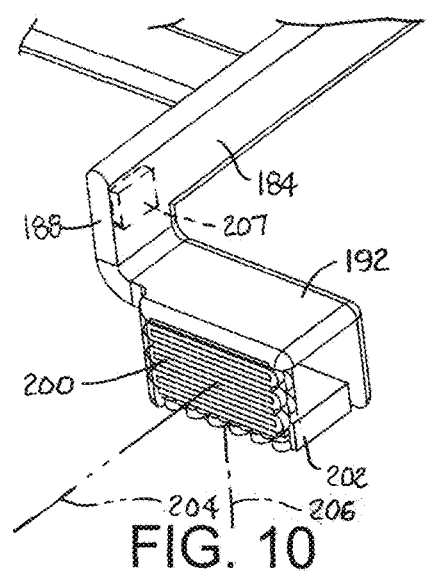
FIG. 10 is an enlarged isometric view of a corner portion of a carriage as in FIG. 9 showing vertical and horizontal translators in a partly open housing.

A carriage for carrying a tray in a horizontal or a vertical direction or for propelling a tray along its rails is shown in FIG. 9. The carriage 180 comprises a left rail 182 and a right rail 184 connected and maintained in parallel by a pair of connecting members 186. The tops of the left and right carriage rails 182, 184 form a two-rail carriage tray guide for the trays. Like the rails in the conveyor segments, the left rail 182 encapsulates a left linear stator, and the right rail 184 encapsulates a right linear stator. A rear translator at a rear end 188 of the carriage 180 comprises a left rear translator in a left rear housing 190 suspended below and outward of the left rail 182 and a right rear housing 192 suspended below and outward of the right rail 184. In a similar way a front translator at a front end 189 of the carriage 180 comprises left and right front translators in left and right front housings 194, 196. As shown in FIG. 10, each translator includes one or two three-phase windings. In this example the right rear housing 192, shown open to reveal the translators suspended from the right rail 184 at the rear end 188, has a vertical translator 200 and a horizontal translator 202. The vertical translator 200 has a horizontal magnetic axis 204, and the horizontal translator 202 has a vertical magnetic axis 206. The translators in the corner housings 190, 192, 194, 196, besides coacting with conveyor-frame stators to propel the carriage along a track, couple power to the stators in the left and right rails 182, 184. The rail stators, when energized, propel trays along and off the rails 182, 184. So the translators are electrically connected to the rail stators. The carriage could also encapsulate one or more weight sensors 207 in the rails 182, 184 or in the corner translator housings 190, 192, 194, 196 to weigh the trays and their contents.

Figure 11:
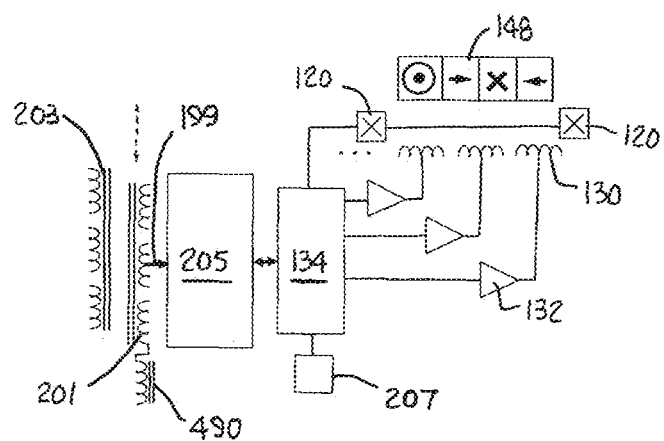
FIG. 11 is a block diagram of the electrical circuit in the carriage of FIG. 9.

FIG. 11 is a block diagram of the circuit embedded in the carriage frame. The carriage-rail stator drive system including the three-phase stator coils 130, the coil-drive amplifiers 132, the carriage drive control 134, and the position sensors 120 is schematically the same as for the conveyor segments described with respect to FIG. 4. The stator drive-system components are distributed between the rails and the translator housings within the carriage frame. The output 199 of the three-phase horizontal and vertical translator windings 201 provides electrical power to the drive control 134, amplifiers 132, and rail stators 130 to drive the conveyor-tray translators 148 and to the position sensors 120 and the weight sensors 207. The translator windings 201 receive power inductively from a conveyor-frame stator 203. Power-line communication, in which data on a high-frequency carrier is superposed on the ac power, is used to communicate data and control signals between the carriage drive control 134 and the system computer. The position sensors 120 and the weight sensors 207 send sensor signals to the carriage drive control 134. A power and communication system 205 includes: (a) a filter section to separate the communication signals from the ac power; (b) a rectifier to convert the ac power into dc; (c) a voltage regulator regulating the dc voltage to power the carriage drive control 134; (d) a decoder to decode received communication signals; and (e) a modulator and line driver to transmit outgoing data messages including tray position and weight data over the translator windings 199. The stator drive control 134 processes the decoded incoming messages received from the power and communication system 205 and sends data messages to the power and communication system for transmission over the power system. The carriage translator 201 forms a switched-reluctance linear motor with the conveyor-frame stator 203 to move the carriage. When the carriage is stopped, the power from the conveyor-frame stator 203 is used to drive conveyor trays along the carriage rails.

Figure 12A:
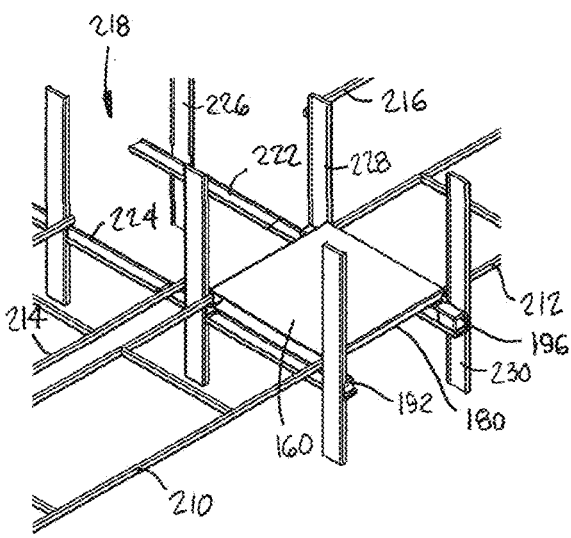
FIGS. 12A-12D are isometric views of a three-dimensional tray sorter constructed of conveyor segments as in FIG. 1.
Figure 12B:
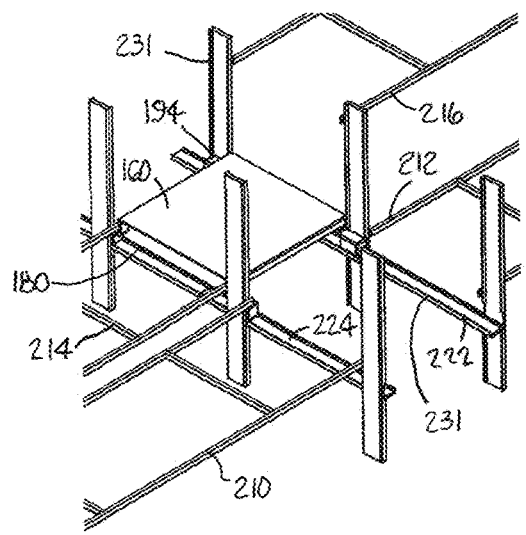
Figure 12C:
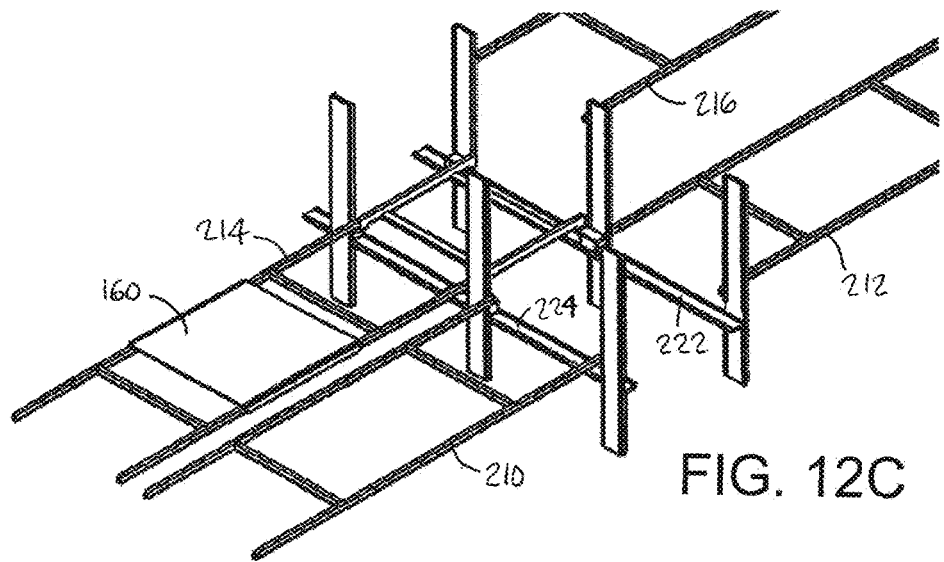
Figure 12D:
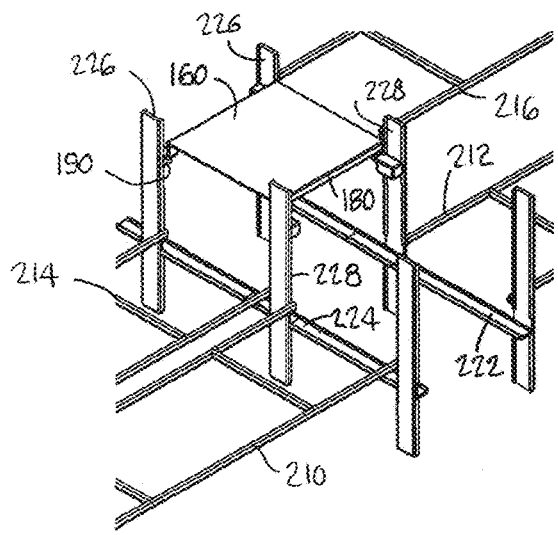

FIGS. 12A-12D describe one example of a conveyor system using a carriage. The conveyor has four conveyor sections: a first lower section 210; a second lower section 212 in line with the first lower section 210; a third lower section 214 parallel to and laterally offset from the first conveyor section 210; and a fourth upper section 216 horizontally and vertically offset from the first conveyor section 210. The four conveyor sections 210, 212, 214, 216 are separated from each other across gaps forming a main space 218. A gantry is disposed in the space 218. The gantry has two parallel horizontal guide tracks 222, 224 and three pairs of parallel vertical guide tracks 226, 228, 230. To simplify the drawing the gantry frame supporting the guide tracks is not shown. The translator housings 190, 192, 194, 196 ride in the guide tracks 222, 224, 226, 228, 230. Upper lips 231 along the sides of the guide tracks retain the translator housings in the tracks. Each of the guide tracks includes a linear stator (not shown) extending along the length of the guide track selectively propagating a magnetic flux wave along the track to propel the carriages' translators. A carriage 180 with a conveyor tray 160 atop it is shown in FIG. 12A in a position in which the tray 160 can be passed along the carriage rail from the first lower conveyor section 210 to the inline second lower conveyor section 212. The left and right rails of the carriage in that position are effectively continuous with the left and right side rails of the first and second conveyor sections 210, 212. If the tray 160 is selected for another destination, the carriage 180 is propelled along the horizontal guide tracks 222, 224 to a position in which the rails are aligned with the third lower conveyor section 214 as shown in FIGS. 12B and 12C. The stators in the carriage may then be energized to propel the tray 160 off and onto the third conveyor section as shown in FIG. 12C. If the scheduled destination is the upper conveyor section 216, the carriage 180 is raised by the stators in the vertical guide tracks 226, 228 to the level of the upper conveyor section, as shown in FIG. 12D. The carriage's stator rails are then energized to propel the tray 160 off the carriage 180 and onto the upper conveyor section 216.

Figure 13:
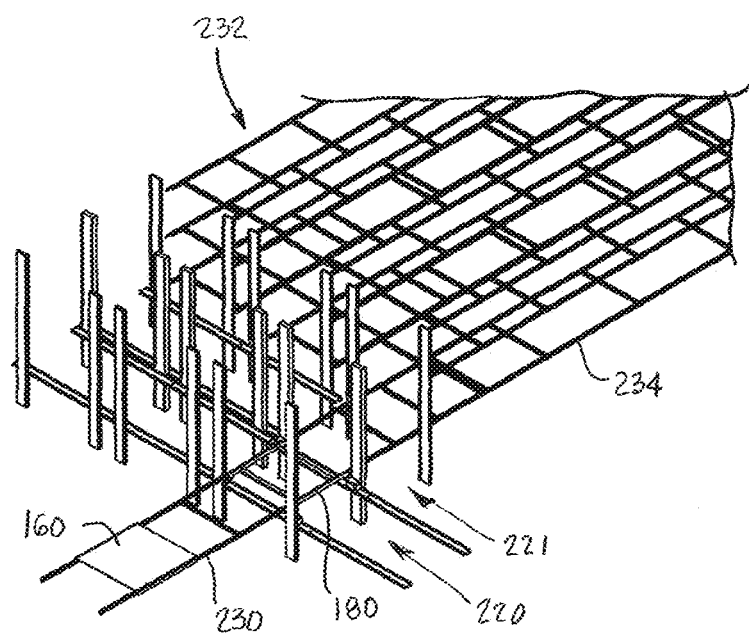
FIG. 13 is an isometric view of an accumulator constructed of conveyor segments as in FIG. 1.

A more complex conveyor system is shown in FIG. 13 in which two rows of gantries 220, 221 are used to move a carriage 180 with trays 160 horizontally and vertically along guide tracks from an infeed conveyor section 230 onto or off parallel conveyor sections 232 arranged in multiple horizontally offset rows of vertically stacked conveyor sections to accumulate trays with articles for later processing. Trays carrying articles scheduled for processing are passed directly across the carriage 180 in its home position shown in FIG. 13 from the infeed conveyor section 230 onto a discharge conveyor section 234. When trays in the accumulator section 232 are scheduled for processing, they are moved to a position at the gantries 221 and onto a carriage 180, which is then moved along the guide tracks to the home position so the tray can be propelled off the carriage and onto the discharge conveyor section 234. Although only a single carriage 180 is shown in the gantries 220, 221 in FIG. 13, more than one carriage can be used.

Figure 14A:
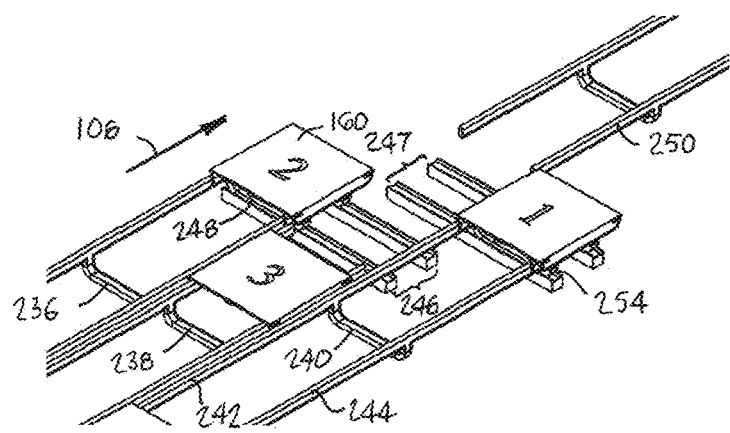
FIGS. 14A-14C are isometric views of a merge conveyor constructed of conveyor segments as in FIG. 1.
Figure 14B:
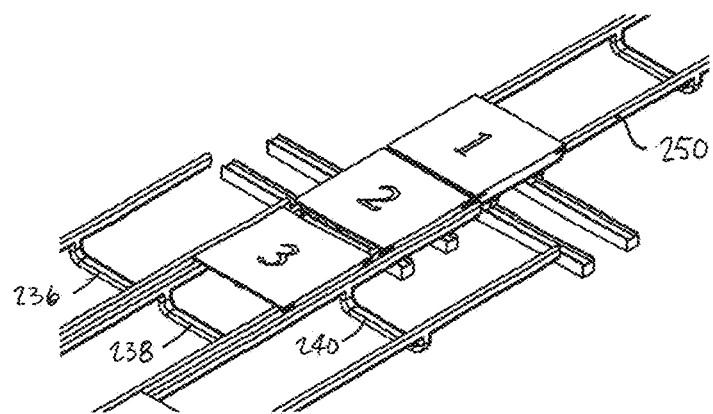
Figure 14C:
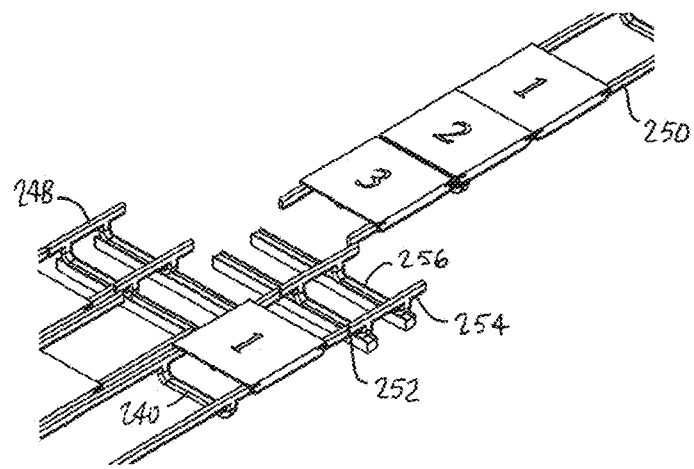

FIGS. 14A-14C depict the operation of a merge conveyor constructed of three infeed conveyor sections 236, 238, 240 with dual stator rails 242, 244 as in the conveyor section of FIG. 1. The three infeed sections 236, 238, 240 are shown side by side in parallel. A first pair 246 of horizontal guide tracks extends perpendicular to the conveying direction 106 at the common ends of the left and center infeed conveyor sections 236, 238. The first pair 246 of guide tracks bridges those two conveyors and forms a first diverter section. A first carriage 248 (FIG. 14C) rides on the first pair 246 of tracks to move trays 160 horizontally to a discharge conveyor section 250 in line with the center infeed conveyor 238 across a space. The right infeed conveyor section 240 extends past the ends of the other two infeed sections 236, 238 to an end 252 laterally across from the front end of the first carriage 248. A second pair 247 of guide tracks parallel to the first pair 246 bridges the space between the right infeed conveyor section 240 and the discharge conveyor section 250. The second pair 247 of guide tracks form a second diverter section to drive a second carriage 254. The sequence of operations required to merge Tray 1, Tray 2, and Tray 3 onto the discharge conveyor section 250 is as follows:

1. transport Tray 1 on the right infeed conveyor section 240 onto the second carriage 254 as in FIG. 14A;
2. transport Tray 2 on the left infeed conveyor section 236 onto the first carriage 248 as in FIG. 14A;
3. move the second carriage 254 and Tray 1 laterally along the second set 247 of guide tracks until the carriage is aligned with the discharge conveyor section 250;
4. move the first carriage 248 and Tray 2 laterally along the first set 246 of guide tracks until the carriage is in line with the discharge conveyor section 250;
5. with the two carriages 248, 254 both in line with the center infeed conveyor section 238 and the discharge conveyor section 250, energize all those rails to propel Tray 1, Tray 2, and Tray 3 onto the discharge conveyor section as in FIG. 14B;
6. return the carriages 248, 254 to their positions in line with the left and right infeed conveyors 236, 240 as required to collect the next set of trays to be merged onto the discharge conveyor section 250 as in FIG. 14C.

In this one-level version no vertical elevation is required, and the translators 256 in a connecting member 258 joining the rails of the carriages 248, 254 require only horizontal translators. The same configuration of conveyor sections can be used as a 1-to-3 switch by reversing the conveying direction 106. In that case, the discharge conveyor section 250 would operate as an infeed conveyor section, and the three infeed conveyor sections 236, 238, 240 would be discharge conveyors, with the guide tracks 246, 247 and carriages 248, 254 as the switches.

Figure 56:
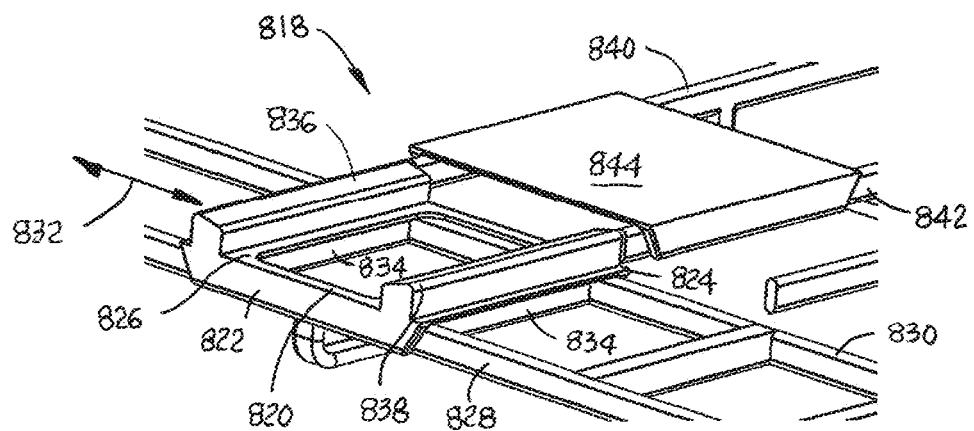
FIG. 56 is an isometric view of another version of a one-level diverter section usable in various conveyor, such as a merge conveyor as in FIGS. 14A-14C.

Another version of a diverter section 818 is shown in FIG. 56. A carriage 820 has rear and front skirts 822, 824 depending from a carriage body 826. The skirts 822, 824 have built-in translators, such as permanent-magnet arrays as in the conveyor trays. The diverter section 818 has stator rails 828, 830 like those in the conveyor segments of FIG. 1. The carriage 820 moves along the tracks defined by the rails 828, 830 in a translation direction 832. Cross pieces 834 joining the diverter's stator rails 828, 830 house coils that energize the stators in carriage rails 836, 838 extending upward from left and right sides of the carriage body 826. When the carriage rails 836, 838 are aligned with rails 840, 842 of discharge or infeed conveyor sections, the carriage-rail stators are energized to induct trays 844 like the tray of FIG. 7 onto or to propel them off the carriage.

Figure 57:
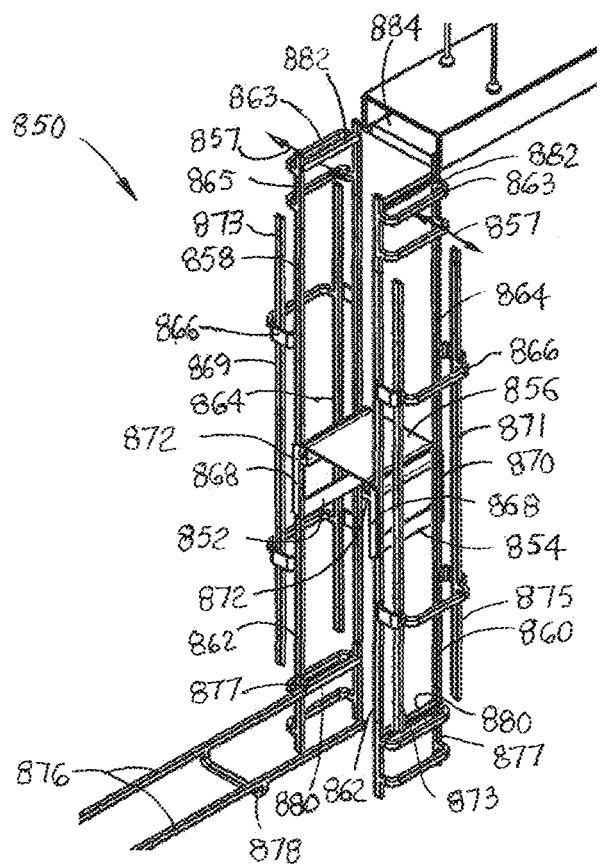
FIG. 57 is an isometric view of a dual-rail elevator using a pair of carriages as in FIG. 56 to form a tray platform.

FIG. 57 shows a dual-rail elevator 850 using two carriages 852, 854 to form an elevator platform for a conveyor tray 856. The carriages 852, 854 are similar to the carriage 720 shown in FIG. 56. The elevator 850 comprises two upgoing vertical conveyor sections 858, 860 each with left and right stator rails 862, 864. At the top of each upgoing conveyor section 858, 860 is a shuttle conveyor segment 863 with stator rails 865 aligned with the left and right stator rails 862, 864 in a first position. Each shuttle 863 translates laterally outward as indicated by arrows 857 with one of the carriages 852, 854 from an associated upgoing conveyor section 858, 860 to one of two downgoing conveyor sections 869, 871 with left and right stator rails 873, 875. When the shuttles are in a second position with their rails 865 aligned with the downgoing rails 873, 875, the carriages 852, 854 are advanced onto the downgoing rails 873, 875 for their trips back to the bottom of the elevator 850. Then the upper shuttles 863 return inward to their first positions. Identical lower shuttles 877 are disposed at the bottom of the elevator 850 to carry the carriages 852, 854 from the outer downgoing rails 873, 875 to the inner upgoing rails 862, 864. In this up-down elevator 850, multiple pairs of carriages can run simultaneously. (The operation of the shuttles 863, 877 is also described in reference to elevator carriages shown in FIGS. 22A-22D, which operate identically in moving vertically instead of horizontally.) The upgoing conveyor sections 858, 860 are arranged in parallel, facing each other in a conveyor frame 866. The carriages 852, 854 have left and right skirts 868, 870 with translators, such as an array of permanent magnets, that form linear motors with the linear stators in the vertical stator rails 862, 864. The linear motors drive the carriages 852, 854 up the upgoing elevator rails 862, 864. Each carriage 852, 854 has an upper stator rail 872 at its upper end. The stator in the carriages' upper rails 872 form linear motors with translators in the tray's skirts 874 to induct the tray 856 onto or propel it off the elevator 850. The two carriages 852, 854 are driven up and down parallel to each other with their upper rails even to form a level platform for the tray 856. At the bottom of the elevator 850, the upper carriage rails 872 are aligned with rails 876 of a lower conveyor section 878. Coils in horizontal cross pieces 880 in the lower shuttles 877 energize the stators in the carriage's upper rails 872. The energized carriage stators induct trays 856 onto or propel them off the carriage platform. Coils are also disposed in upper cross pieces 882 in the upper shuttles 863 at the top of the elevator 850 to similarly feed trays 856 to or receive trays from an upper conveyor section 884. In case power to the elevator 850 is interrupted, each carriage 852, 854 has a brake (not shown, but described later) that engages to prevent the carriage from falling.

Figure 15A:
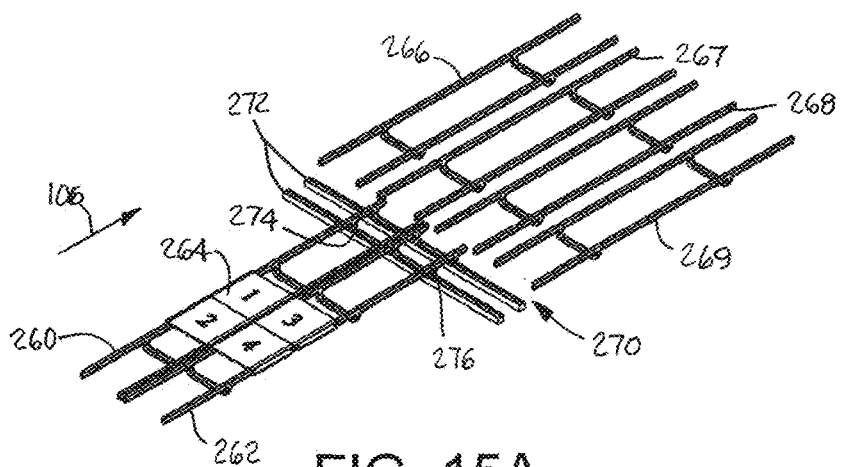
FIGS. 15A-15C are isometric views of a multi-tray sorter constructed of conveyor segments as in FIG. 1.
Figure 15B:
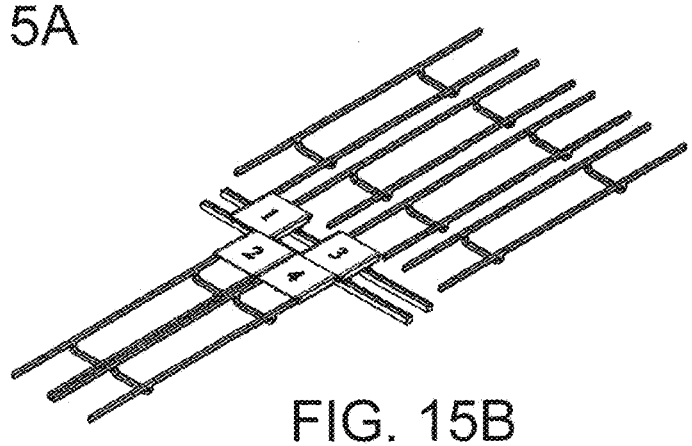
Figure 15C:
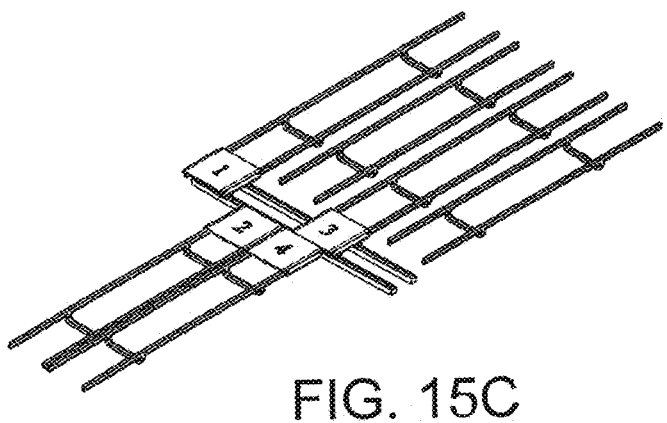

A multi-tray sorter is shown in FIGS. 15A-15C. A pair of side-by-side infeed conveyor sections 260, 262 transport a group of four conveyor trays 264 in a conveying direction 106. The infeed conveyor sections 260, 262 are spaced apart from four discharge conveyor sections 266, 267, 268, 269 across a space 270. Two horizontal guide tracks 272 are positioned in the space 270 perpendicular to the conveying direction 106. The guide tracks 272 support and drive a pair of carriages 274, 276 along the tracks. The carriages 274, 276 receive the trays 264 from the infeed conveyor sections 260, 262 and move them laterally to their destination infeed conveyor section as shown in FIGS. 15B and 15C. The carriage rails are then energized to propel the trays 264 onto the destination outfeed conveyor section. Two carriages 274, 276 are used—one for each infeed conveyor section 260, 262. Running a multi-tray sorter in reverse changes the conveyor's operation to that of a combiner joining individual groups of trays into a larger multi-tray.

Figure 16:
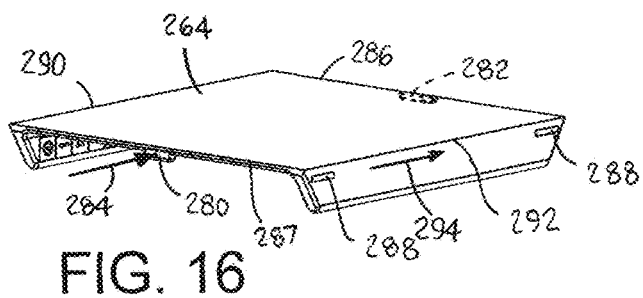
FIG. 16 is an isometric view of a conveyor tray usable in a multi-tray sorter as in FIGS. 15A-15C.

To ensure that the trays 264 remain together as a group on the infeed conveyor sections, clamping magnets are positioned on the trays as shown in FIG. 16. Each conveyor tray 264 has a rear clamping magnet 280 and a front clamping magnet 282. The front and rear clamping magnets attract the rear and front clamping magnets of leading and trailing trays on the same infeed conveyor section. For example, the rear clamping magnet of Tray 1 in FIG. 15A attracts the front clamping magnet of Tray 2 to keep the trays together on the left infeed conveyor section 260. Either the front clamping magnet 282 or the rear clamping magnet 280 could be replaced by a ferrous material that would be attracted by the clamping magnet of the leading or trailing tray. As shown in FIG. 16, the magnets are polarized to exert a high magnetic clamp force along a polar axis in a direction 284 perpendicular to the front and rear edges 286, 287 of the trays 264 and a lower magnetic shear force in a direction parallel to the front and rear edges. That polarization holds consecutive trays together on each infeed conveyor, but allows them to be separated easily by the carriages 274, 276 (FIG. 15) for sorting as in FIGS. 15B and 15C. To keep laterally adjacent conveyor trays in each group together, such as Tray 1 and Tray 3 or Tray 2 and Tray 4 in FIG. 15A, the conveyor trays 264 have one or more left and right clamping magnets 288 at the left and right edges 290, 292 of the conveyor trays. The left and right clamping magnets 288 are polarized to exert a high shear force along a polar axis in a direction 294 parallel to the left and right edges 290, 292 and a lower clamp force perpendicular to the left and right edges. In this way the laterally adjacent trays are held together side by side in the infeed conveyor and easily separated laterally by the carriages for sorting. Like the front and rear clamping magnets, one or the other of the left and right clamping magnets can be replaced by a ferrous material to be attracted to the clamping magnet.

Figure 17:
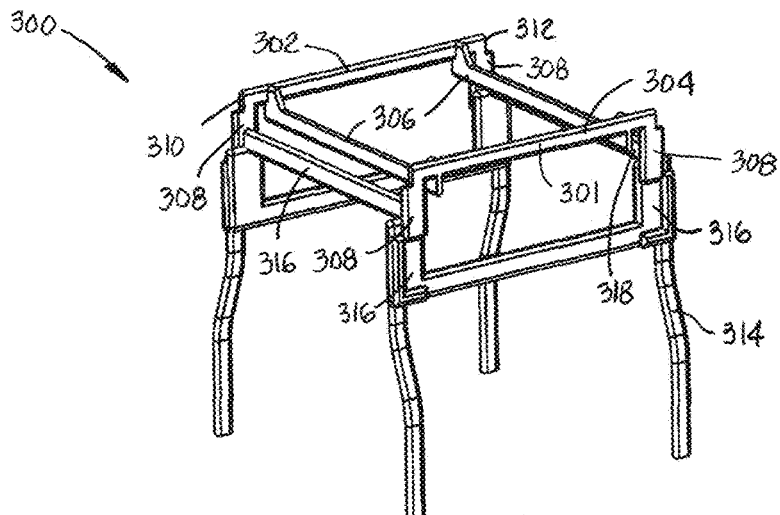
FIG. 17 is an isometric view of an elevator usable with the conveyor segments of FIG. 1.

A right-angle elevator section usable with conveyor segments as in FIG. 1 is shown in FIG. 17. The elevator 300, shown in a raised position, comprises a carriage 301 having left and right stator rails 302, 304 maintained in parallel by cross members 306. Vertical translators 308 depend from the left and right rails 302, 304 at rear and front ends 310, 312. The translators are electrically connected to stators embedded in the elevator rails 302, 304. The elevator carriage 301 is supported on a frame 314 that has vertical guide tracks 316 backed by an embedded vertical linear stator at each corner. The stators backing the vertical guide tracks 316 form linear motors with the translators 308 that raise and lower the elevator carriage 301. The elevator frame 314 also has a pair of parallel stator rails 316, 318 that are perpendicular to the elevator carriage rails 302, 304. When the carriage 301 is in its lower position, the carriage rails 302, 304 sit at a level lower than the level of the frame rails 316, 318 to provide clearance for the conveyor trays as they enter the elevator 300.

Figure 18A:
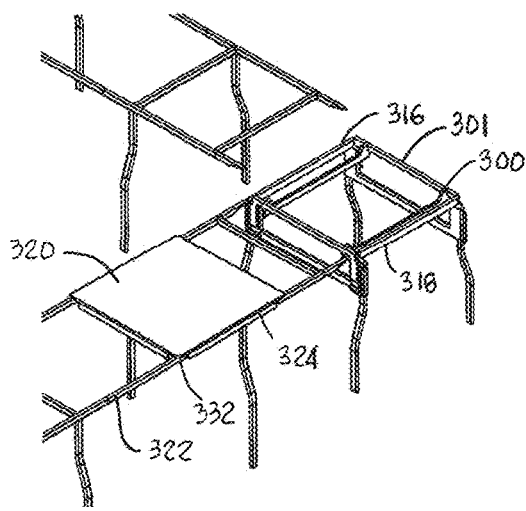
FIGS. 18A and 18B are isometric views of the elevator of FIG. 17 in lowered and raised positions.
Figure 18B:
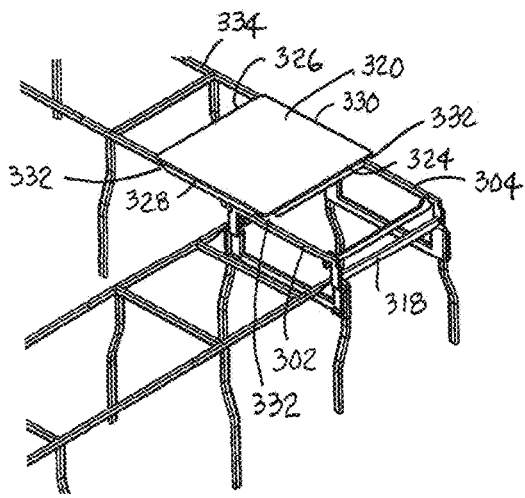

The operation of the right-angle elevator is shown in FIGS. 18A and 18B. A conveyor tray 320 is shown advancing along an infeed conveyor section 322 in FIG. 18A toward a right-angle elevator section 300. The rails of the infeed conveyor section 322 are aligned with the elevator frame rails 316, 318 so that the tray 320 can be transferred onto the lowered elevator carriage 301. Once the tray 320 is on the lowered elevator carriage, the elevator 300 lifts the carriage 301 and tray 320 to the upper position shown in FIG. 18B. Besides having left and right skirts 324, 326 with translators, the tray 320 has rear and front skirts 328, 330 with translators. When the tray 320 is lifted by the elevator 300 off the frame rails 316, 318, it is supported by the carriage rails 302, 304. The skirts 324, 326, 328, 330 do not extend all the way to the corners of the trays 320. Slits 332 are formed in the skirts 324, 326, 328, 330 at each of the four corners of the trays 320. The slits 332 provide passages for the elevator rails so that the trays 320 can be transferred onto the elevator 300 and off at a right angle onto a discharge conveyor section 334.

Figure 19:
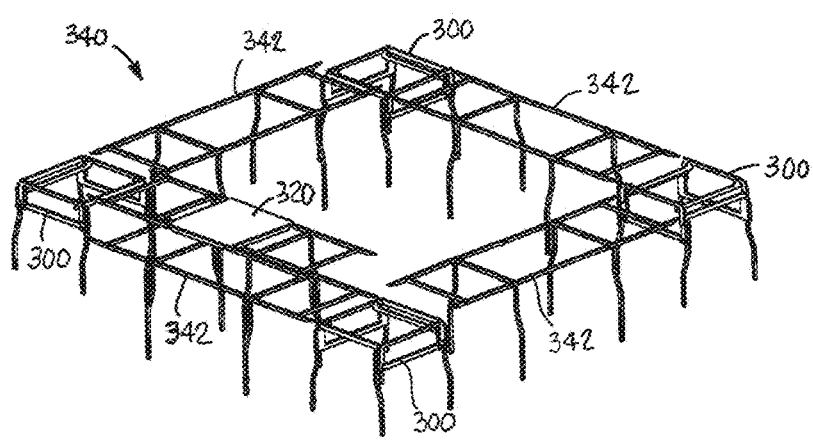
FIG. 19 is an isometric view of a square spiral conveyor constructed of conveyor segments as in FIG. 1 and elevators as in FIG. 17.

FIG. 19 shows a rectangular spiral conveyor constructed of conveyor segments as in FIG. 1 and right-angle elevators as in FIG. 17 at the corners. The spiral conveyor 340 is constructed of conveyor sections 342 arranged to form one tier of a four-sided stepped spiral of consecutive conveyor sections vertically offset from each other. An elevator section 300 at each corner of the spiral conveyor raises or lowers trays 320 from one vertical level to the next. Multiple tiers can be formed with additional conveyor sections 342 and right-angle elevators 300 at the corners.

Figure 20A:
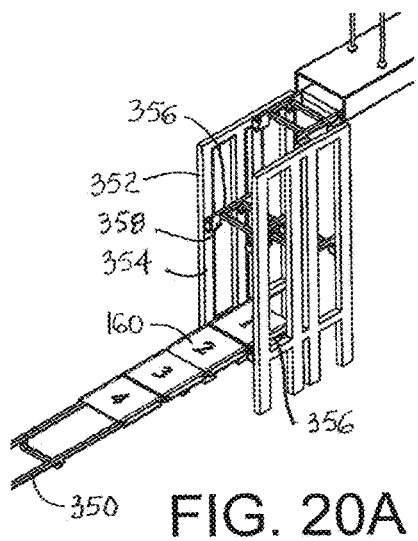
FIGS. 20A-20C are isometric views of an elevator system constructed of conveyor segments as in FIG. 1 with separate up and down paths delivering trays into an overhead pipe.
Figure 20B:
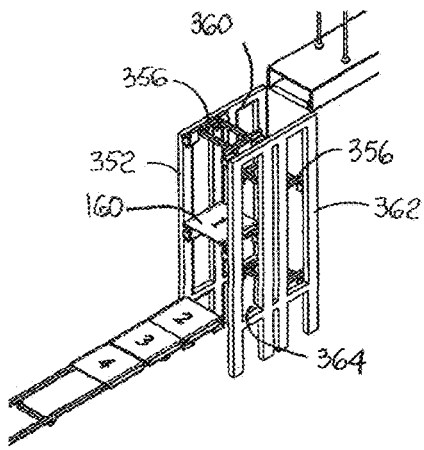
Figure 20C:
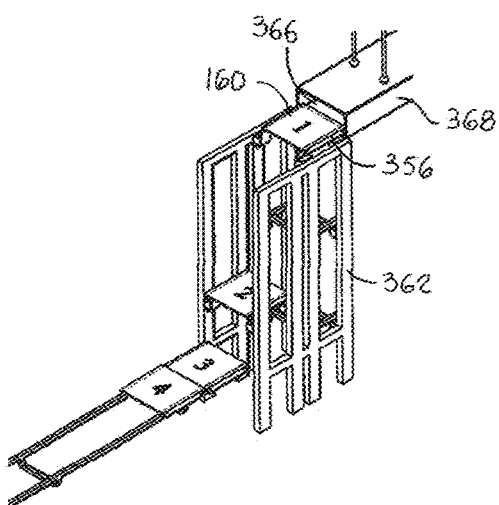

FIGS. 20A-20C depict an elevator having an upgoing path and a horizontally offset downgoing path for an elevator carriage. An infeed conveyor section 350 feeds trays 160 to an upgoing elevator 352 providing a vertical guide track 354 for elevator carriages 356. A carriage 356 at the bottom of the upgoing guide path defined by the vertical tracks 354 with its stator rails aligned with the stator rails of the infeed conveyor section 350 receives a tray 160. Stators in the vertical guide tracks 354 energize vertical translators of two-axis translators 358 at the corners of the carriage 356 to raise the carriage and the tray 160 sitting atop it, as shown in FIG. 20B. Once the carriage 356 reaches the top of the upgoing guide path, horizontal stators along upper horizontal guide tracks 360 energize horizontal translators of the two-axis translators 358 to move the carriage 356 from atop the upgoing elevator 352 to atop a downgoing elevator 362. The downgoing elevator has a vertical guide track defining a downgoing guide path adjacent to the upgoing guide path. The downgoing guide path serves as a return path for emptied carriages 356. A lower horizontal guide path 364 guides the trays back into the home position at the bottom of the upgoing elevator 352 in position to receive another incoming tray 160. Thus, the elevator allows a number of carriages 356 to circulate around the closed loop formed by the upgoing and downgoing guide paths and the upper and lower horizontal guide paths. When the tray-carrying carriage 356 is at the top of the downgoing elevator 362, as in FIG. 20C, the carriage's rail stator is energized to propel the tray 160 off onto a discharge conveyor section 366. The discharge conveyor 366 can be contained within a pipe 368 suspended from above to prevent anything from falling from the trays onto the floor or onto persons or conveyors below and to prevent contamination of products on the conveyor trays 160 from external sources.

Details of the two-axis translators 358 are shown in FIG. 31. Outward-facing pole faces 480 of a core 482 are arranged in an array. Three-phase horizontal and vertical windings 484, 485 on the core 482 allow the translator 358 to move vertically or horizontally in a direction 486 parallel to the carriage rails. The carriages 356 have safety brakes 488 suspended from the translator housings. As shown in FIGS. 32A and 32B, the safety brake 488 includes a solenoid 490 with a plunger 492 connected to an outward-facing permanent magnet 494 through an outwardly-biasing coil spring 496. As shown in FIG. 11, the solenoid 490 is electrically in series with the translator windings. As long as the carriage 356 is powered, the solenoid 490 is actuated as shown in FIG. 32A to draw the plunger 492 and the magnet 494 inward away from the elevator guide track so that the carriage 356 can move along the elevator guide tracks. When electric power to the carriage 356 is lost, the solenoid 490 is de-actuated, and the compressed spring 496 releases to push the plunger 492 and the magnet 494 outward to a braking position at the outside 498 of the translator housing as in FIG. 32B. The magnet 494 in the braking position is close enough to the metal of the guide tracks for magnetic attraction to hold the unpowered carriage 356 in place and prevent it from plummeting to the bottom of the elevator.

Figures 21A, 21B:
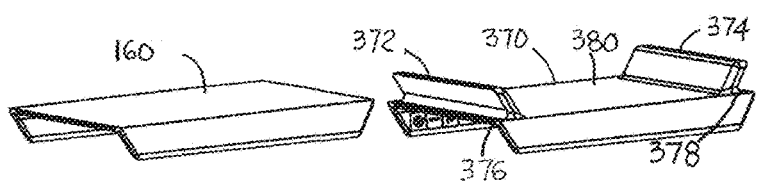
FIGS. 21A-21C are axonometric views of a cover tray, a conveyor tray, and a cover tray covering a conveyor tray for use in a conveyor system embodying features of the invention.
Figure 21C:
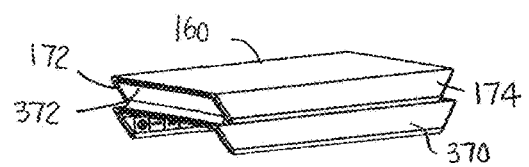

The conveyor tray 160 in FIG. 21A can be used as a cover for a conveyor tray 370 as shown in FIG. 21B. The tray 370 is generally the same as the cover tray 160, except that it has a rear wall 372 and a front wall 374 upstanding from the rear edge 376 and the front edge 378 of the article-conveying surface 380. As shown in FIG. 21C, the underside of the cover tray 160 is supported atop the two walls 372, 374 of the covered tray 370. The rear and front walls 372, 374 can be shaped as shown to fill the gap at the rear and front ends of the cover between the skirts 172, 174 to completely enclose the volume between the two trays 370, 160.

Figure 22A:
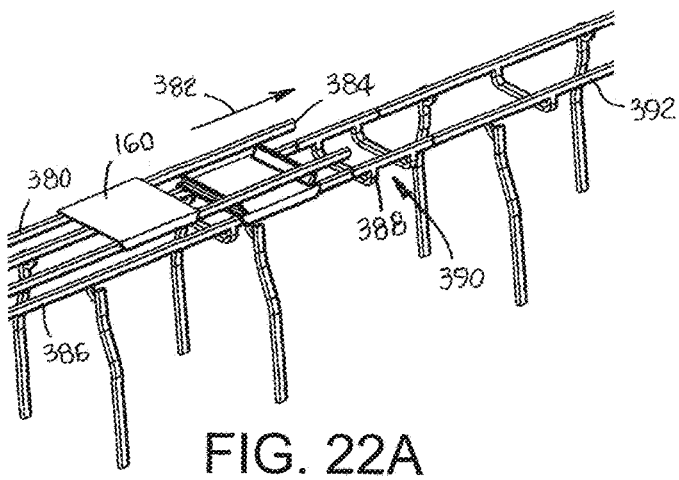
FIGS. 22A-22D are isometric views of a conveyor system using conveyor segments as in FIG. 1 to put a cover over a conveyor tray.
Figure 22B:
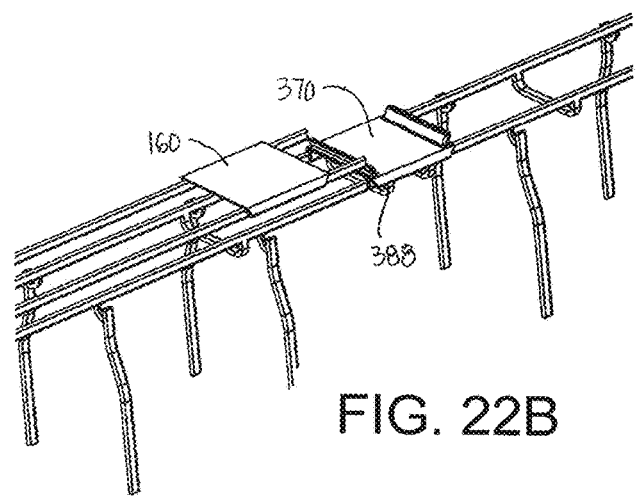
Figure 22C:
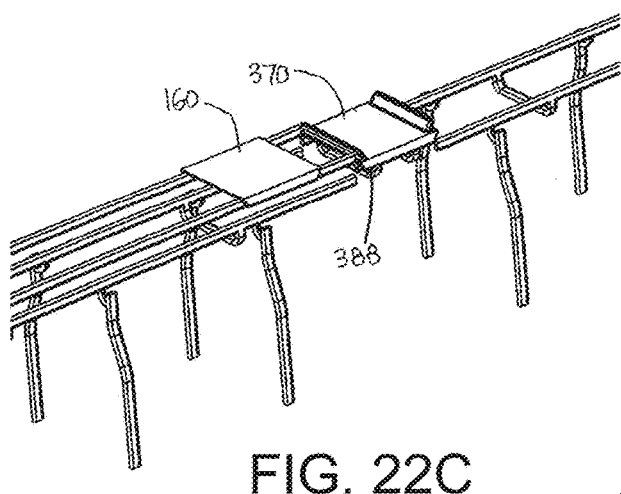
Figure 22D:
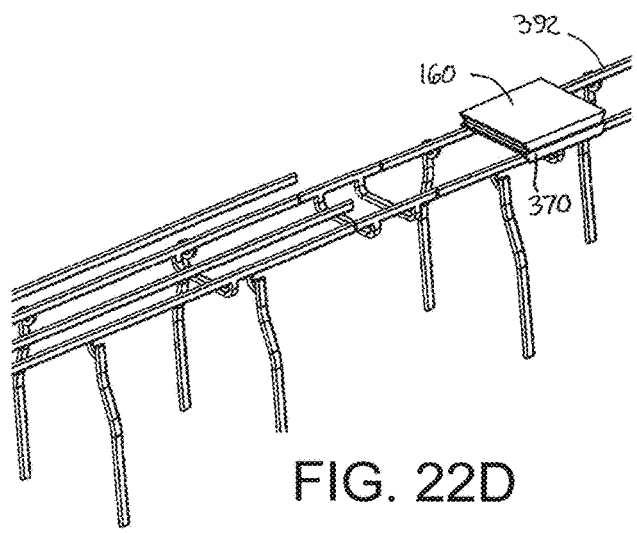

A conveyor for covering and uncovering a tray 370 with a cover tray 160 is shown in FIGS. 22A-22D. In FIG. 22A, a cover tray 160 is transported along an upper conveyor section 380 in a first conveying direction 382 toward an open end 384. A walled tray 370 to be covered advances in the same direction 382 on a lower conveyor section 386 directly below the upper conveyor section 380. An elevator section (frame and guide tracks not shown) including a carriage 388 bridges a space 390 between the lower conveyor section 386 and an aligned second lower conveyor section 392 when the carriage is in a lower position as in FIG. 22B. The elevator raises the carriage 388 with the tray 160 into an upper position to receive the cover tray 160, as shown in FIG. 22C. Once the cover tray 160 is in place covering the lower walled tray 370, the elevator carriage 388 is lowered and the stator rails in the carriage and the second lower conveyor 392 are energized to propel the covered tray downstream as in FIG. 22D.

Figure 23A:
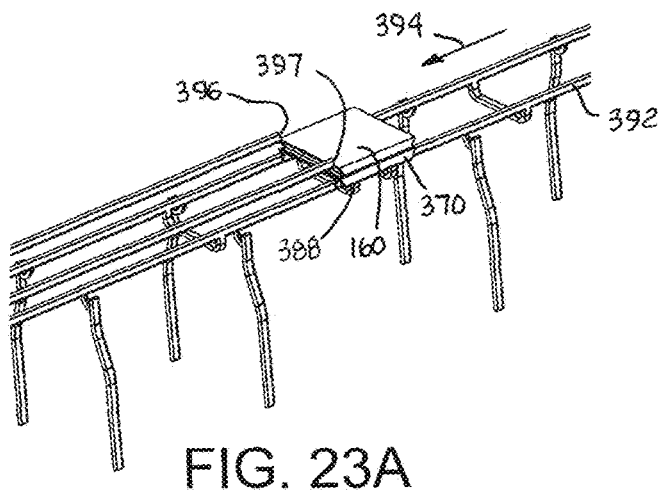
FIGS. 23A-23C are isometric views of the conveyor system of FIGS. 22A-22D illustrating the removal of a tray cover.
Figure 23B:
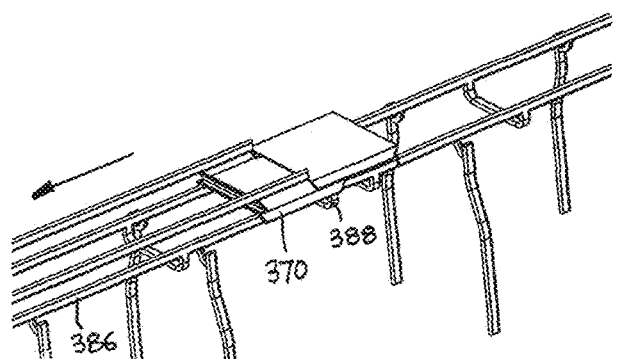
Figure 23C:
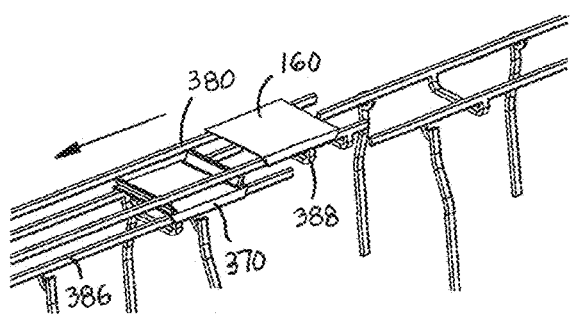

The lower tray 370 is uncovered as shown in FIGS. 23A-23C. The covered and covering trays 370, 160 are conveyed on the second lower conveyor section 392 in a conveying direction 394 toward the elevator carriage 388 in its lower position, as shown in FIG. 23A. The ends 396, 397 of the stator rails in the upper conveyor section 380 serve as stops that prevent the cover tray 160 from advancing farther with the lower walled tray 370 as it proceeds onto the first lower conveyor section 386, as shown in FIG. 23B. Once the walled conveyor tray 370 is clear of the elevator carriage 388, the elevator raises the carriage to the upper position, energizes the carriage's stator rails, and propels the cover tray 160 onto the upper conveyor section 380 as shown in FIG. 23C.

Figure 24:
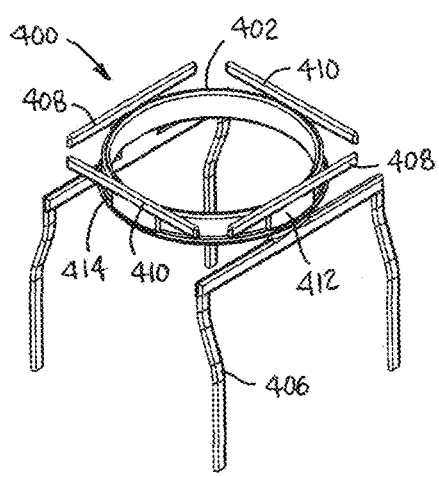
FIG. 24 is an isometric view of a diverter usable with conveyor segments as in FIG. 1.
Figure 25:
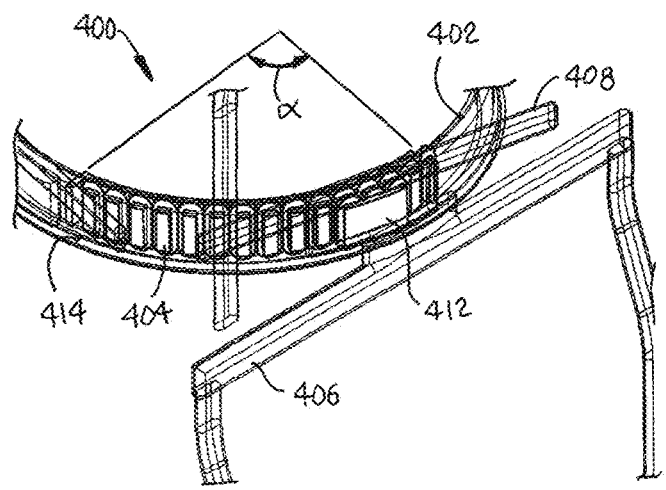
FIG. 25 is an enlarged transparent view of a portion of the diverter of FIG. 24 illustrating a curved stator.

FIGS. 24 and 25 depict a diverter section usable in conveyors constructed of conveyor segments as in FIG. 1. The diverter section 400 comprises a circular track 402—a ring, for example—that houses a curved stator 404 subtending an angle α around the circular track. An identical curved stator (not shown) is diametrically opposite the curved stator 404 in the circular track 402. The circular track 402 is supported in a diverter frame 406. Two orthogonal pairs of side rails 408, 410 are supported on translators 412 that ride on a raceway ledge 414 of the circular track 402. One pair of the side rails 410 is optional. The side rails 408, 410 may be manually lifted from the ledge 414 for repair, replacement, or cleaning.

Figure 27:
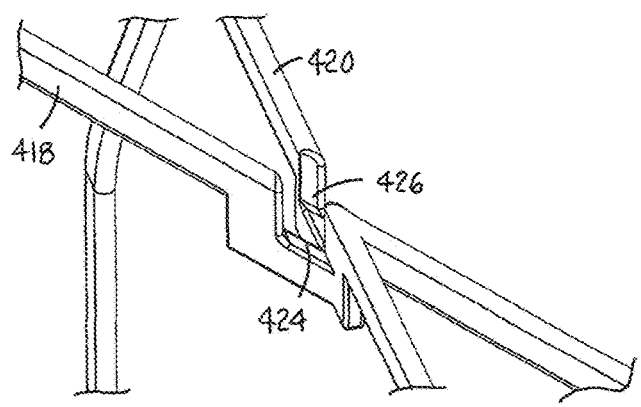
FIG. 27 is an enlarged isometric view of the crossing portion of rails in the diverter conveyor of FIGS. 26A-26D.

FIGS. 26A-26D show a diverting conveyor using the diverter section 400 of FIGS. 24 and 25. The diverter section 400 resides in a gap 401 (FIG. 26C) between an infeed conveyor section 416, an inline discharge conveyor section 418, and a side-off conveyor section 420. The infeed conveyor section 416 conveys trays 160 toward the diverter section 400 in a conveying direction 106. The curved stators in the circular track 402 inductively energize stators in the inline rails 408 in the diverter 400 to send a leading tray 160A straight across the diverter onto the inline discharge conveyor section 418, as shown in FIG. 26B. When a tray 160B meant to be diverted onto the side-off discharge conveyor section 420 reaches the diverter 400, the curved stators are energized to rotate translators over a divert angle δ until the inline diverter rails 408 are aligned with the rails 422 of the side-off conveyor section 420, as shown in FIG. 26C. The curved stators in the circular track 402 then energize the stators in the diverter rails 408 to propel the tray 160B onto the side-off conveyor section 420, as shown in FIG. 26D. The angle α (FIG. 25) subtended by the stationary curved diverter stator is greater than or equal to the divert angle δ of the conveyor. As shown in FIGS. 26A and 27, the rails of the discharge conveyor sections 418, 420 dip down to provide notches 424, 426 at their intersection to accommodate the passing tray skirts.

Figure 28:
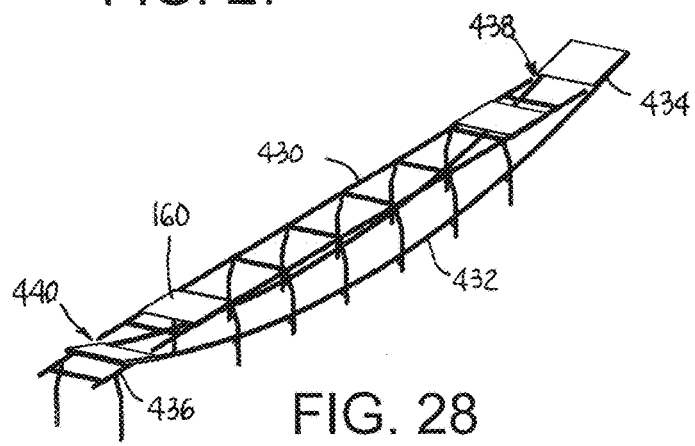
FIG. 28 is an isometric view of a conveyor using curved conveyor segments as in FIG. 1 in a return path.

A conveyor with a curved lower return is shown in FIG. 28. The conveyor comprises a flat upper main carryway section 430 with a curved lower returnway section 432 directly below. The upper carryway 430 is constructed of one or more conveyor segments as in FIG. 1. The lower return is constructed of similar segments, but with curved rails. And portions of the lower returnway conveyor section include two end portions 434, 436 that are coplanar with the ends of the carryway section 430 to resemble a gondola. The rails of the carryway section 430 and the end portions 434, 436 are aligned across narrow gaps 438, 440. The gaps 438, 440 are narrow enough for trays 160 on the carryway section 430 to pass over with little slowdown and wide enough for trays to move onto the returnway section 432 without contacting the carryway section.

Figure 29A:
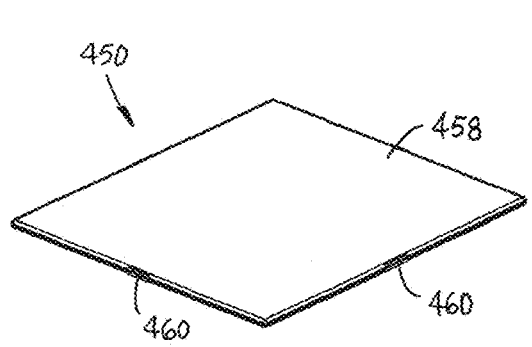
FIGS. 29A and 29B are top and bottom isometric views of another version of a conveyor tray for use in a conveyor system embodying features of the invention.
Figure 29B:
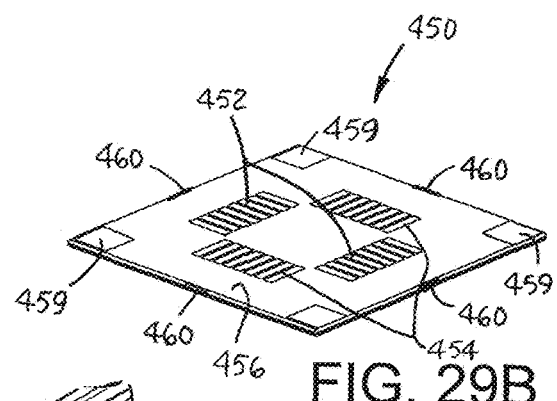
Figure 30:
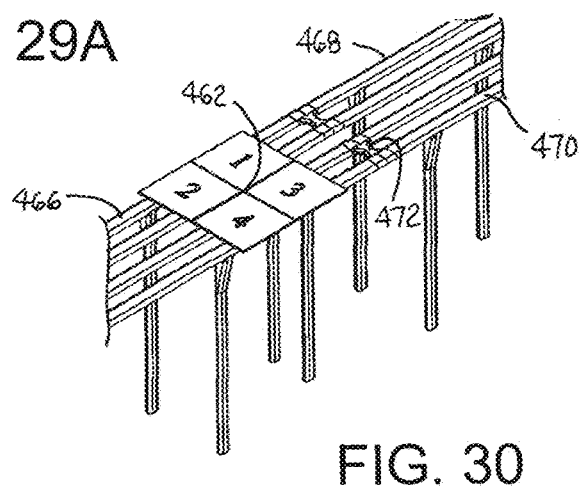
FIG. 30 is an isometric view of a portion of a conveyor system constructed of conveyor segments compatible with the conveyor trays of FIGS. 29A and 29B.

FIGS. 29A and 29B show a skirtless tray 450 having two orthogonal pairs of translators 452, 454 at the underside 456 of the tray. The upper side 458 of the tray 450 provides a flat article-supporting surface. The translators 452, 454 comprise permanent-magnet arrays whose magnetic fields are directed downward perpendicular to the tray's article-supporting surface 458 and underside 456. Corner magnets 459, such as Halbach arrays, are optionally disposed in the corners of the tray 450 for magnetic levitation as described subsequently. The trays may also include side, front, and rear clamping magnets 460 at the tray sides so that the trays can be used to form a larger multi-tray 462 as in FIG. 30. The clamping magnets are like those in the trays 264 shown in FIG. 16. The skirtless trays 450 with underside translators are designed to run on flat-top rails 466 with stators that form linear motors with the translators 452, 454. The rails 466 with embedded stators serve as a tray guide for the trays 450. In FIG. 30 two conveyor sections 468, 470 are arranged side by side to allow for the formation of the multi-tray 462. Connecting structure 472 maintains the left and right rails in parallel.

Figure 33:
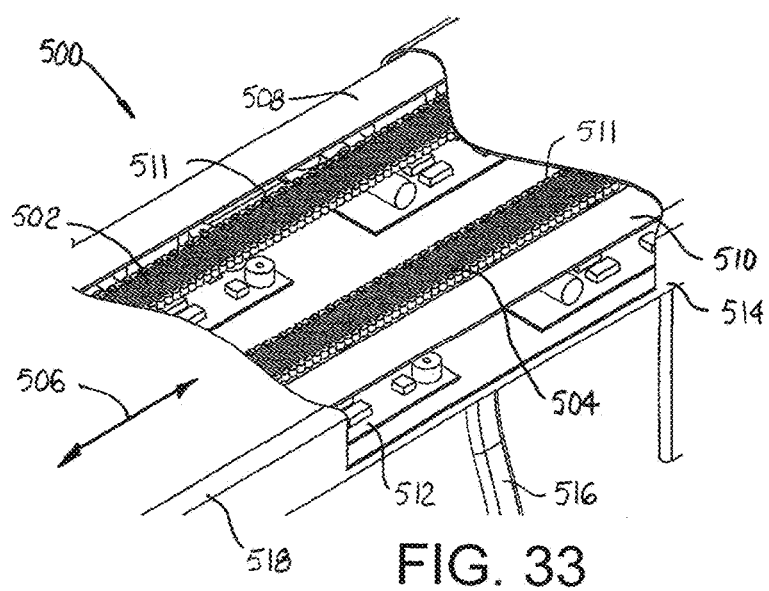
FIG. 33 is an isometric view, partly cut away, of a portion of another version of a conveyor segment for moving a conveyor tray as in FIGS. 29A and 29B.
Figure 34:
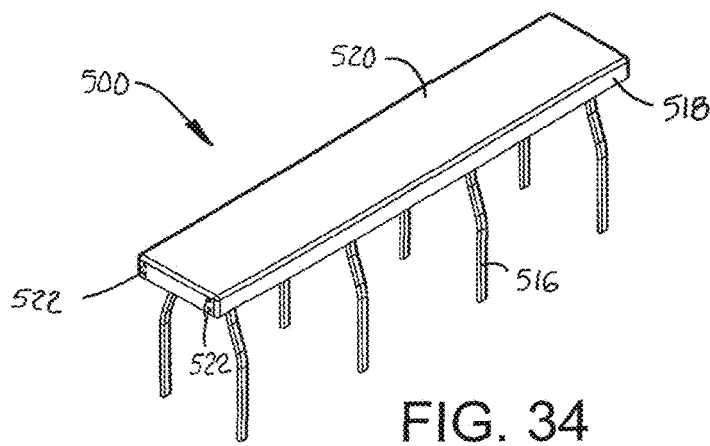
FIG. 34 is an isometric view of the conveyor segment of FIG. 33.

Another version of a conveyor segment embodying features of the invention is shown in FIGS. 33 and 34. The conveyor segment 500 has two parallel stators 502, 504 that extend in length from one end of the segment to the other. The stators 502, 504 are ironless and spaced apart a distance substantially the same as the distance between opposite translators 452 on the trays 450 (FIG. 29B). The stators 502, 504 each produce a magnetic flux wave that travels along the length of the stator in a conveying direction 506.

Electrically conductive magnetic-levitation (maglev) plates 508, 510 extend along the length of the conveyor segment 500 laterally outward of the stators 502, 504. While a conveyor tray 450 as in FIG. 29B is propelled in the conveying direction 506 by the stators 502, 504, the tray's corner magnets 459 (FIG. 29B) induce electric currents in the maglev plates 508, 510 that generate reactive magnetic fields opposing the corner magnets' fields with enough force to levitate the trays for a low-friction ride. Position sensors 511 are positioned along the length of the conveyor segment 500 to detect the presence of trays at their positions and send a sensor signal indicating that detection to an electronic drive-control circuit 512. Electric power and communication wiring to the drive control 512 can be routed to external circuits or computers through legs 516 of a conveyor frame 514. The stators 502, 504, the position sensors 511, the electronic drive-control circuits 512, and the wiring are all encapsulated in a tray-guide housing 518 having a flat top surface 520 and forming a tray guide along which trays are propelled. Just inside the housing 518 at each end along both sides are alignment magnets 522 or ferrous elements attracted by the magnets to align adjacent sections as in FIG. 5. In the conveyor segments of FIGS. 30 and 34, the tray guides support the trays along the tops of the tray guides by magnetic levitation rather than directly by contact as do the tray guides in the conveyor segments of FIG. 1. Like the trays in FIG. 6, the trays 450 are easy to remove and replace without interference from interlocking or other conveyor structure.

Figure 35:
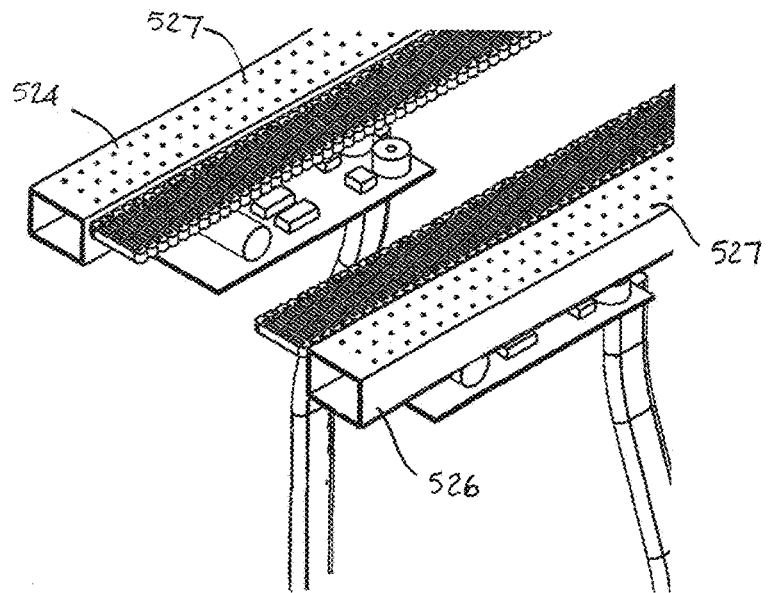
FIG. 35 is an isometric view of a conveyor segment as in FIG. 33 with air-bearing levitation instead of magnetic levitation.

FIG. 35 shows another version of a conveyor segment in which the maglev plates 508, 510 of FIG. 33 are replaced by air ducts 524, 526. Pressurized air from an air source (not shown) is injected into the ducts 524, 526 and expelled through openings 527 in the tops of the ducts to levitate conveyor trays on an air cushion. In this case corner magnets 459 as in FIG. 29B are not required on the trays 450.

Figure 36:
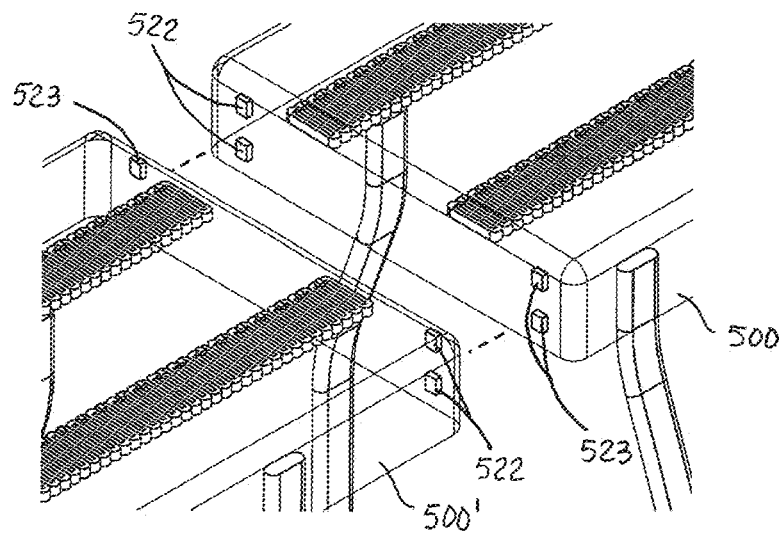
FIG. 36 is an enlarged exploded view of two abutting conveyor segments as in FIG. 34.

The lateral alignment of abutting conveyor segments 500, 500' is shown in FIG. 36. In this example one conveyor segment 500 has a pair of alignment magnets 522 at one side and a pair of ferrous elements 523 at the other side. The facing end of the adjacent conveyor section 500' has a pair of magnets 522 at one side and a pair of ferrous elements 523 at the other. The magnets 522 attract the ferrous elements 523. The lateral dimensions of the magnets 522 and ferrous elements 523 match for accurate lateral alignment of the abutting segments 500, 500'. Of course, all the ferrous elements 523 may be replaced with magnets of opposite polarity to the confronting magnets of the abutting conveyor segment. But by arranging the magnets 522 and ferrous elements 523 as described, all the segments can be made the same, and the polarity of the magnets will not matter.

Figure 37:
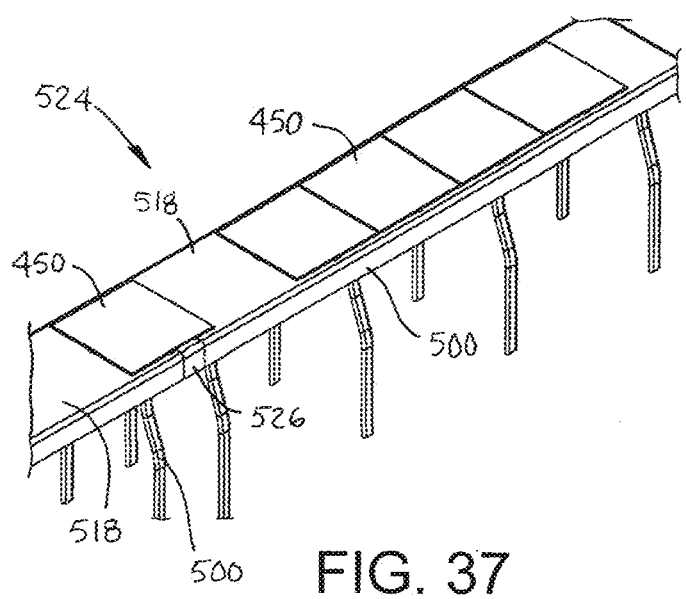
FIG. 37 is an isometric view of a portion of a conveyor section constructed of conveyor segments as in FIG. 34.

As shown in the conveyor section 524 of FIG. 37, a cover 526 provides a smooth joint between the housings 518 of abutting conveyor segments 500. As FIG. 37 also shows, the conveyor trays 450 may be advanced individually or together in a train.

Figure 38:
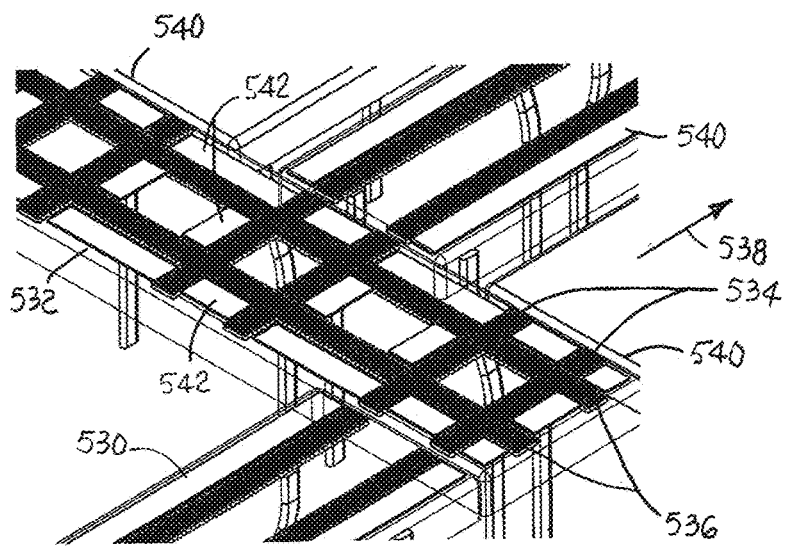
FIG. 38 is an isometric view of a conveyor, partly in phantom, constructed of conveyor segments as in FIG. 34 and an x-y conveyor section.
Figure 39:
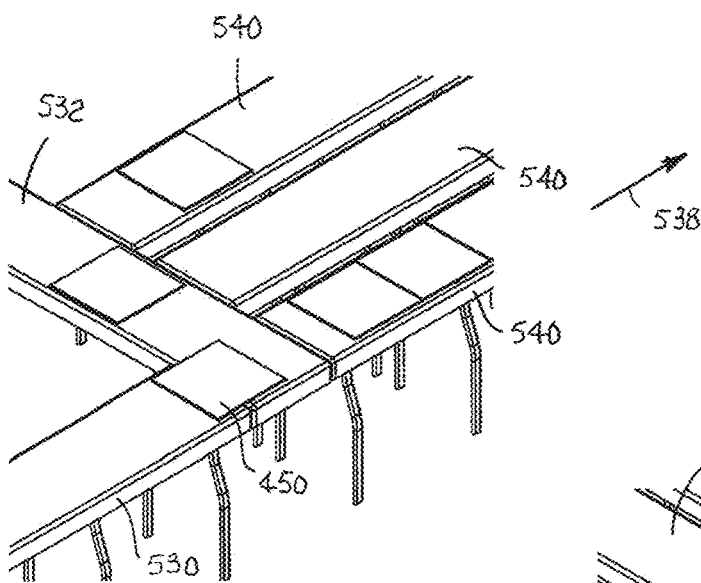
FIG. 39 is an isometric view of a conveyor switch using an x-y conveyor section as in FIG. 38.

FIGS. 38 and 39 show a conveyor arrangement for a 1-to-N switch. A single infeed conveyor section 530 feeds conveyor trays 450 onto an x-y conveyor segment 532 extending in length perpendicular to the infeed conveyor section 530. The x-y conveyor segment 532 has two pairs of stators 534, 536 perpendicular to each other. The first pair of stators 534 drives the trays 450 in the main conveying direction 538. The second pair of stators 536 drives the trays 450 transverse to the main conveying direction to one of N (three are shown) discharge conveyor sections 540. The first stators 534 form linear motors with the left and right translators in the trays, and the second stators 536 form linear motors with the front and rear translators. Conductive plates 542 flanking the pairs of stators levitate the trays 450 as they advance along the x-y conveyor segment 532.

Figure 40:
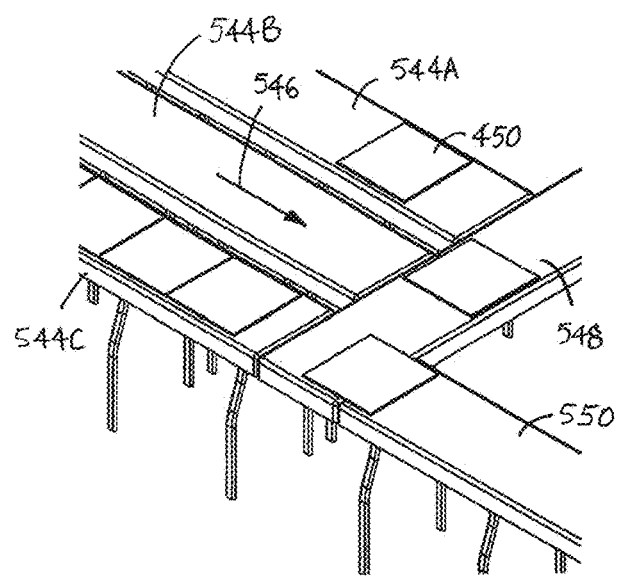
FIG. 40 is an isometric view of a merge conveyor using an x-y section as in FIG. 38.

A merge conveyor is shown in FIG. 40 in which N (three are shown) infeed conveyor sections 544A-544C propel conveyor trays 450 in a main conveying direction 546 to an x-y conveyor section 548. The x-y conveyor section 548 inducts the trays 450 from the infeed sections 544A-544C and translates them to a single discharge conveyor section 550. The topology of the merge conveyor is the same as that of the switch conveyor of FIGS. 38 and 39 with the main conveying direction reversed.

Figure 41:
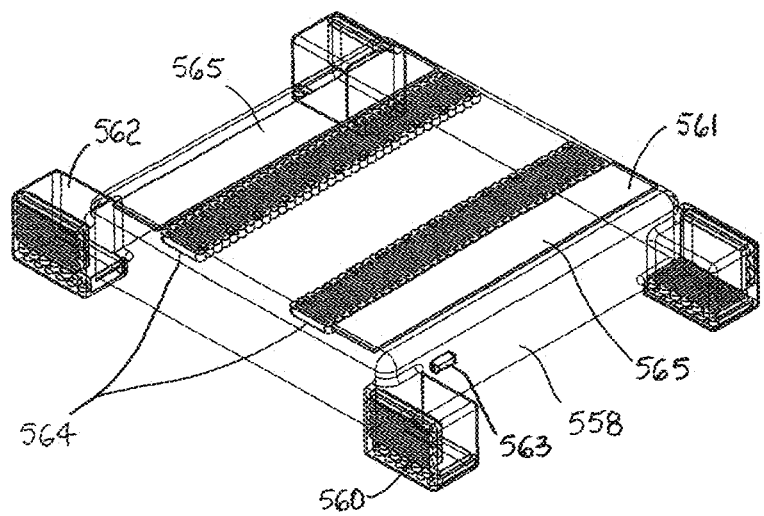
FIG. 41 is an isometric view, partly cut away, of a carriage usable with a conveyor tray as in FIGS. 29A-29B.
Figure 42:
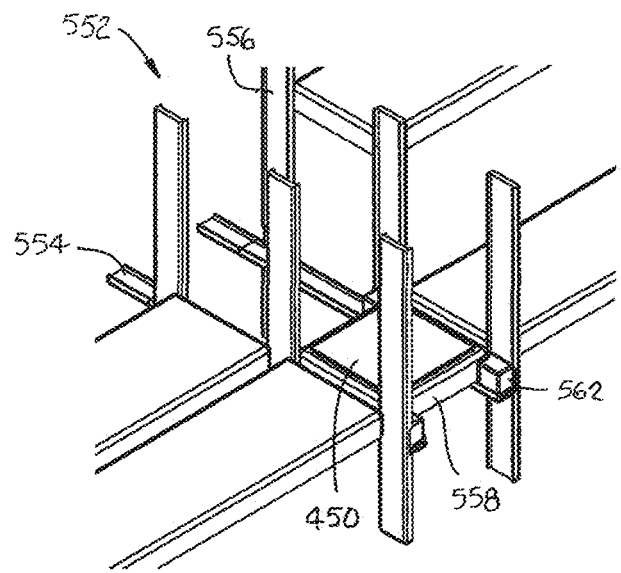
FIG. 42 is an isometric view of a portion of a bi-level conveyor system using a carriage as in FIG. 41.

A multi-level conveyor 552 for a conveyor tray 450 as in FIGS. 29A and 29B is shown in FIG. 42. The layout of the conveyor as shown is the same as that for the three-dimensional tray sorter shown in FIGS. 12A-12D. And the operation is similar. Conveyor stators along horizontal and vertical guide tracks 554, 556 propel a tray-supporting carriage 558 laterally and vertically. The carriage 558, shown in more detail in FIG. 41, has two-axis translators 560 in translator housings 562 at each corner. The housings are shaped to ride in the guide tracks 554, 556. The carriages 558 also include a pair of stators 564 embedded in the carriage body forming a carriage tray guide with the housing. The stators reside below a continuous top tray-guide surface 561 to induct trays 450 into the carriage and to propel them off. Like the carriage of FIG. 10, the carriage 558 can include weight sensors 563 at the corners (only one shown in FIG. 41). The weight sensors 563 communicate and, along with the stators 564, are powered through the translators 560, which receive power inductively from the conveyor stators along the guide tracks 554, 556. Electrically conductive strips 565, like those 508, 510 in the levitating conveyor segment 500 of FIG. 33, extend along the carriage 558 beside the stators 564 and are used in levitating the trays 450.

Figure 43:
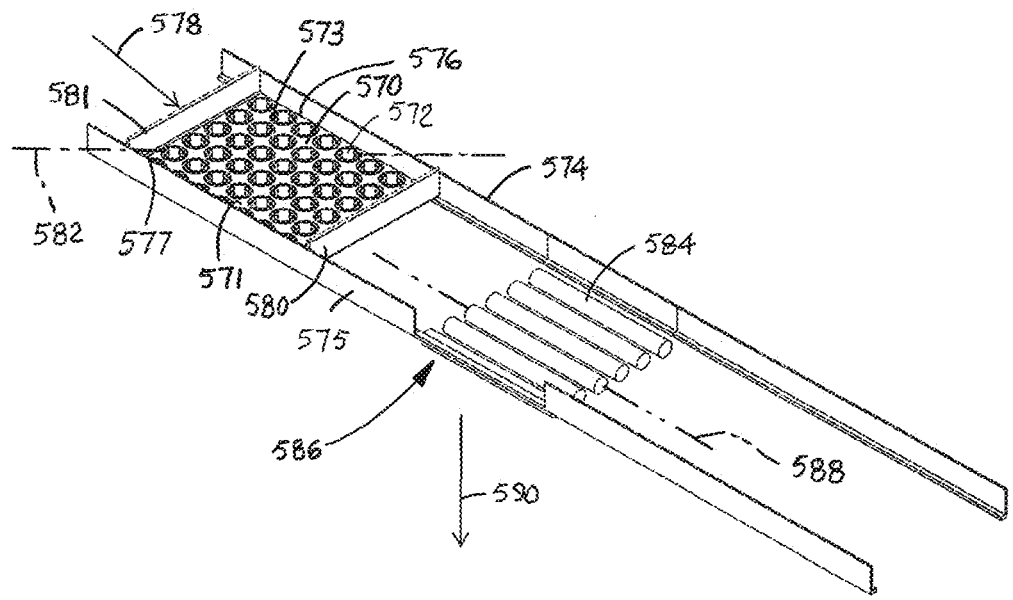
FIG. 43 is an isometric view of a linear-motor-driven diverting conveyor using a conveyor tray having oblique article-supporting rollers to divert articles off one side of the conveyor.
Figure 44:
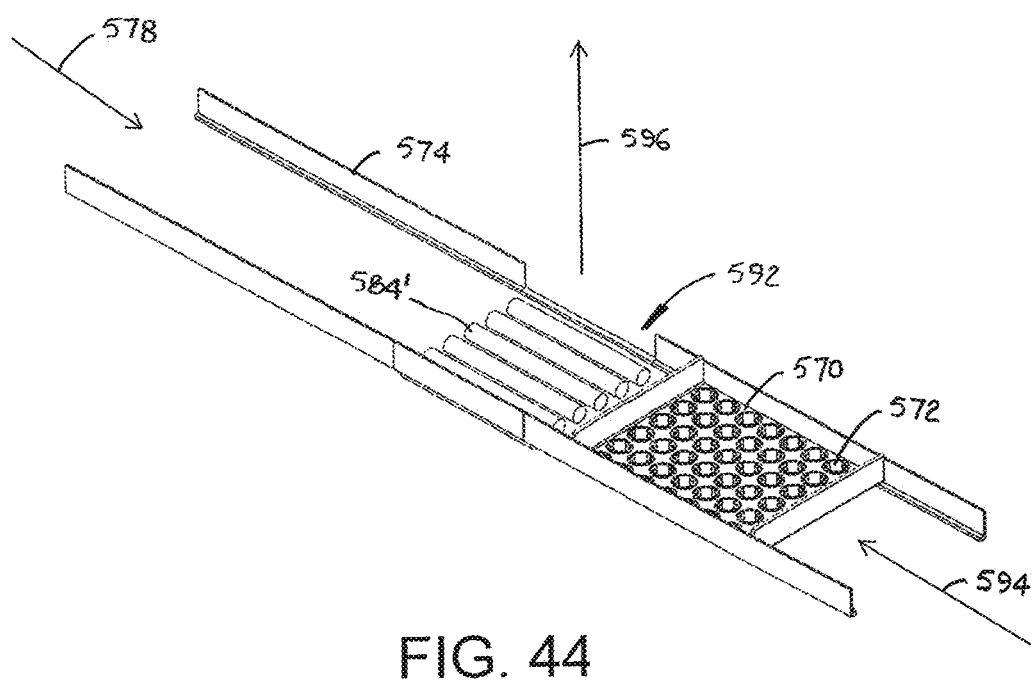
FIG. 44 is an isometric view of the conveyor of FIG. 43 diverting articles off the opposite side.

Another version of a conveyor tray is shown in FIGS. 43 and 44. The tray 570, instead of supporting articles on a flat top surface, supports articles atop rollers 572 that extend through the thickness of the body of the tray. Drive stators (not shown) under left and right stationary conveyor side walls 574, 575 coact with translators (not shown) along the left and right side edges 576, 577 of the tray 570 to propel it in a main conveying direction 578. Front and rear walls 580, 581 on the tray 570 prevent articles from falling off the front and rear edges of the tray during starts, stops, and other accelerations. The rollers 572 reside in cavities 573 that open onto the upper surface 571 and the underside of the tray body and are freely rotatable on axles defining axes of rotation 582 oblique to the main conveying direction 578. Elongated actuating rollers 584, supported in the conveyor frame adjacent an opening 586 in the right conveyor side wall 585, rotate freely on axles defining axes 588 parallel to the main conveying direction 578. The actuating rollers 584 are arranged in line with the columns of tray rollers 572. As the tray 570 passes over the actuating rollers 584, the bottoms of the tray rollers 572 rotate on their oblique axes 582 and push articles atop the rollers off the side of the tray 570 and through the opening 586 in a right-side divert direction 590. Roller balls without axles and rotatable in all directions could alternatively be used in the trays and actuated by the same actuating rollers.

FIG. 44 shows the same conveyor with trays 570 having rollers 572 arranged at the same oblique angle as in FIG. 43. A set of actuating rollers 584' is supported in the conveyor frame adjacent to an opening 592 in the left side wall 574. A tray 570 traveling in the main conveying direction 578 is stopped after passing the actuating rollers 584'. The stator field is reversed to drive the tray 570 in the reverse direction 594 back over the actuating rollers 584'. The tray rollers 572 engaging the actuating rollers 584' in the reverse direction 594 opposite to the main direction rotate in the opposite direction to push conveyed articles through the opening 592 in the left side wall 574 in a left-side divert direction 596.

The conveyor tray 600 in FIG. 45 has stacked roller sets 602 (FIG. 45A) arranged in columns. The bottom roller 604 of each set protrudes beyond the underside of the tray 600. The top roller 606 protrudes beyond the upper surface 608 of the tray 600. The top roller 606 rests on the bottom roller 604—at least when supporting an article—so that rotation of the bottom roller in one direction causes the top roller to rotate in the opposite direction. (The roller set in FIG. 45A is shown without side supports and axles for the top roller 606 for clarity.) Both the top and bottom rollers 604, 606 are arranged to rotate on parallel axles defining axes 610, 611 oblique to the conveying direction 578. As the conveyor tray 600 is propelled over the actuating rollers 584, the bottom rollers 604 rotate forward on their axes 610, which rotates the article-supporting top rollers 606 rearward. Because the component of rearward rotation of the top tray rollers 606 equals the forward motion of the trays 600 along the conveyor, articles are diverted off the trays in a divert direction 612 perpendicular to the main conveying direction 578.

The conveyor tray 614 shown in FIGS. 46 and 46A has tray rollers 616 that rotate on axles defining axes of rotation 618 parallel to the main conveying direction 578. An array of caster-like actuating rollers 620, supported in the conveyor frame, provides tray-roller actuation in this version. The freely rotatable actuating rollers 620 can be swiveled about a vertical axis 613 by a rack-and-pinion system to change their axes of rotation 622. With the actuating rollers 620 angled oblique to the main conveying direction 578 as shown, the tray rollers 616 rotate to push articles across the tray 614 toward an opening 624 in the right side wall 626. Although the tray rollers 616 push the articles off the tray at 90° relative to the tray without contacting the front and rear tray walls 617, 619, they exit through the opening 624 in an oblique direction 628 because of the motion of the tray in the conveying direction 578. When the actuating rollers 620 are swiveled so their axes 622 are at the same oblique angle on the other side of the main conveying direction, the actuated tray rollers 616 rotate toward the left side wall 627 and through an opening 625 in a divert direction 629. Thus, the conveyor is useful for diverting articles off the trays in either direction by changing the orientation of the actuating rollers 620.

Figure 55:
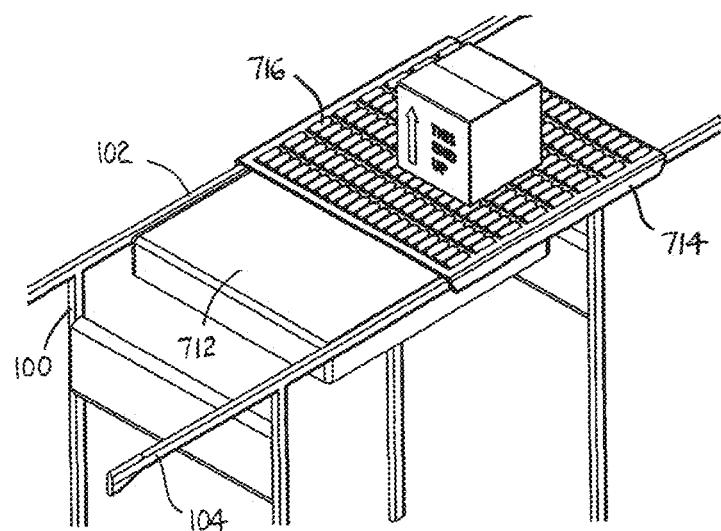
FIG. 55 is an isometric view of a conveyor segment as in FIG. 1 with a linear-motor stator driving rollers in a conveyor tray.

The passive actuating rollers 584 of FIGS. 43-45 could be replaced by a tray-roller actuator in the form of a flat bearing surface on which the tray rollers 572, 604 ride. The flat bearing surface can be stationary, or it can be a moving surface, such as the outer surface of a belt. Or tray-roller rotation can be achieved magnetically or electromagnetically. As one example, the tray-roller actuator supported in the conveyor frame could be permanent magnets, electromagnets, or stators producing magnetic or electromagnetic fields interacting with ferrous, magnetic, or electrically conductive rotors in the tray rollers 572, 604, 616 of FIGS. 43-46. FIG. 55 shows a conveyor segment 100 as in FIG. 1 with a linear-motor stator 712 housed in a smooth housing between the side rails 102, 104. A conveyor tray 714 has an array of rollers 716 with rotors made of permanent magnets or electrically conductive material that form linear motors with the stator 712, which can selectively actuate the rollers 716 into rotation.

Figure 47:
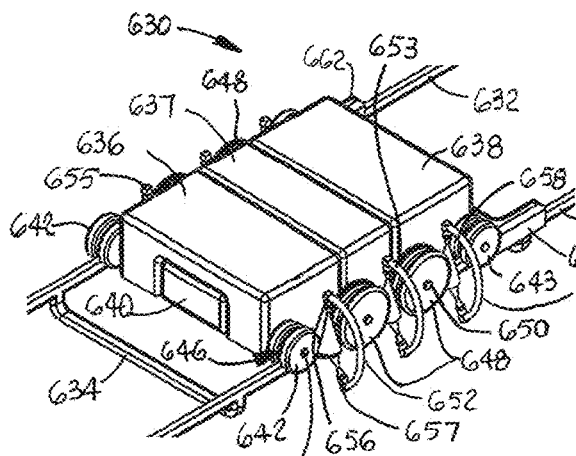
FIG. 47 is an isometric view of a rail scrubber with its cover removed used for cleaning the rails of a conveyor segment as in FIG. 1.
Figure 48:
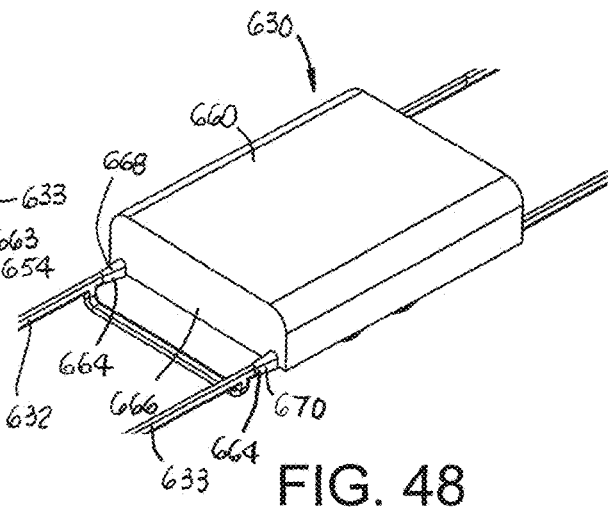
FIG. 48 is an isometric view of the rail scrubber of FIG. 47 with the cover in place.

A rail scrubber 630 is shown in FIGS. 47 and 48 riding the rails 632, 633 on a conveyor segment 634. The scrubber 630 is shown in this example with three fluid tanks: a soap tank 636, a water tank 637, and a sanitizer tank 638. Each tank is in the shape of an inverted U with a space between the legs of the inverted U. A drive system including a drive motor and battery (not shown) are housed in a housing 640 received in the space. The motor, powered by the battery, drives front or rear drive wheels 642, 643 or both to drive the scrubber 630 along the rails 632, 633. The wheels 642, 643 are mounted on axles 644 that extend through the housing 640. The axles 644 are coupled to the drive motor. The wheels 642, 643 each have a central groove 646 that receives the rail 632, 633 and prevents derailment. The scrubber 630 also includes at least one set of scrubbing wheels 648, two sets in this example, to scrub both rails 632, 633. Like the drive wheels 642, the scrubbing wheels 648 are mounted on axles 650 that extend through the central housing 640. The scrubbing wheels 648 are also driven by the drive motor, but perhaps geared differently to rotate at a higher speed than the drive wheels 642. Or the scrubber wheels 648 can be driven by separate motors. The scrubbing wheels 648 include two wheel halves separated by a gap. Scrub-brush pads on confronting faces of the two wheel halves scrub the rail received in the gap. Soap, water, and sanitizer dispensers 652, 653, 654 include fittings 655 connected into the tanks 636, 637, 638, upper and lower spray nozzles 656, 657, and tubing 658 connecting the fittings to the lower nozzles. The dispensers 652, 653, 654 are on each side of the tanks 636, 637, 638 with the nozzles directing a spray at the tops and bottoms of the rails 632, 633. The housing 640 also houses a scrubber computer that controls the speeds of the drive and scrubbing wheels and other electronic and power-supply circuits.

The rail scrubber 630 receives power inductively from the stator windings in the rails 632, 633 through secondary coil windings housed in scrubber appendages 662, 663 that ride along the rails. A single coil may suffice. The ac power transferred by transformer action to the coils is converted to dc power to power the electronics and charge the battery or drive the motors. Alternatively, the drive wheels 642 or the scrubber wheels 648 or both could include magnetic or electrically conductive rotors that are driven by the rail stators. In such a case a drive motor would not be necessary. Or the secondary coil could be replaced by a translator that responds to a rail-stator-generated magnetic flux wave traveling along the rail by pushing the scrubber along the rails. In that case the drive rollers 642 could be idle wheels not coupled to a drive motor.

The tops and sides of the scrubber 630 of FIG. 47 are covered by a smooth stainless steel cover 660 as shown in FIG. 48. Scrapers 664 extend outward from a front face 666 of the cover 660. The scrapers 664 have an inverted-U cross section, a tapered top surface 668, and tapered sides 670 to remove bulk debris from the tray drive rails 632, 633, which are received in the inverted U. The scrapers 664 taper inward away from the front face 666 of the cover 660.

Figure 59:
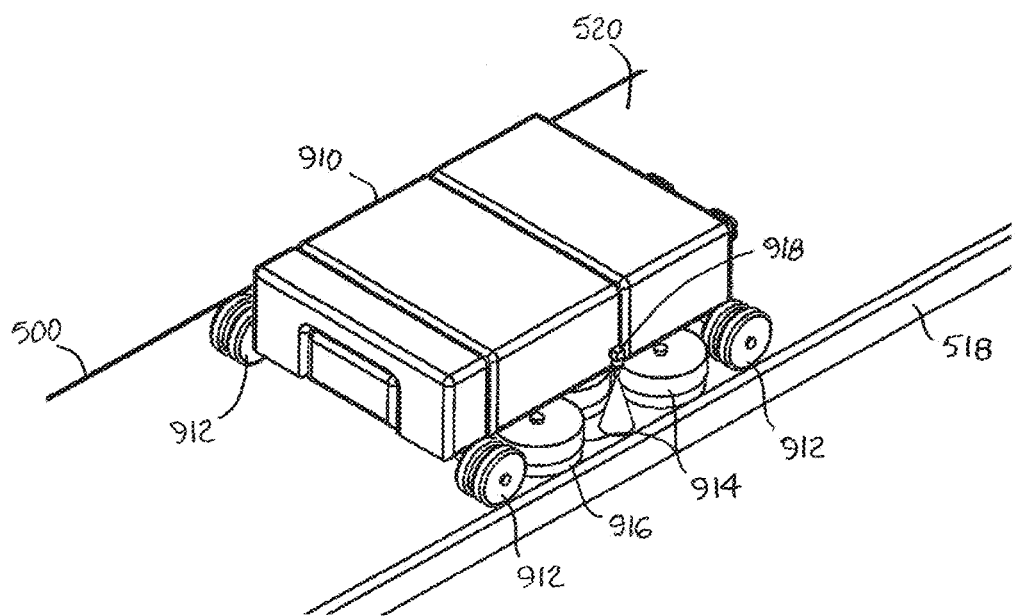
FIG. 59 is an isometric view of a scrubber for cleaning conveyor segments as in FIG. 34.

A similar scrubber 910 for cleaning the top surface 520 of the tray-guide housing 518 of a conveyor segment 500 as in FIGS. 33 and 34 is shown in FIG. 59 without a cover. This scrubber differs from the scrubber of FIG. 47 in that its wheels 912 don't ride on rails. Rather, they ride along the top surface 520 of the tray-guide housing 518. Another difference is that the scrubber wheels 914 are rotated 90° from the scrubber wheels 648 of FIG. 47. Brushes 916 on the bottoms of the scrubber wheels 914 scrub the top surface 520 of the tray guide. Water, soap, and sanitizer are sprayed onto the top surface 520 through spray nozzles 918. The scrubber is powered by an internal battery or by a linear motor formed by the stator in the conveyor segment and permanent-magnet or electrically conductive rotors forming a translator for the scrubber 910.

Figure 49:
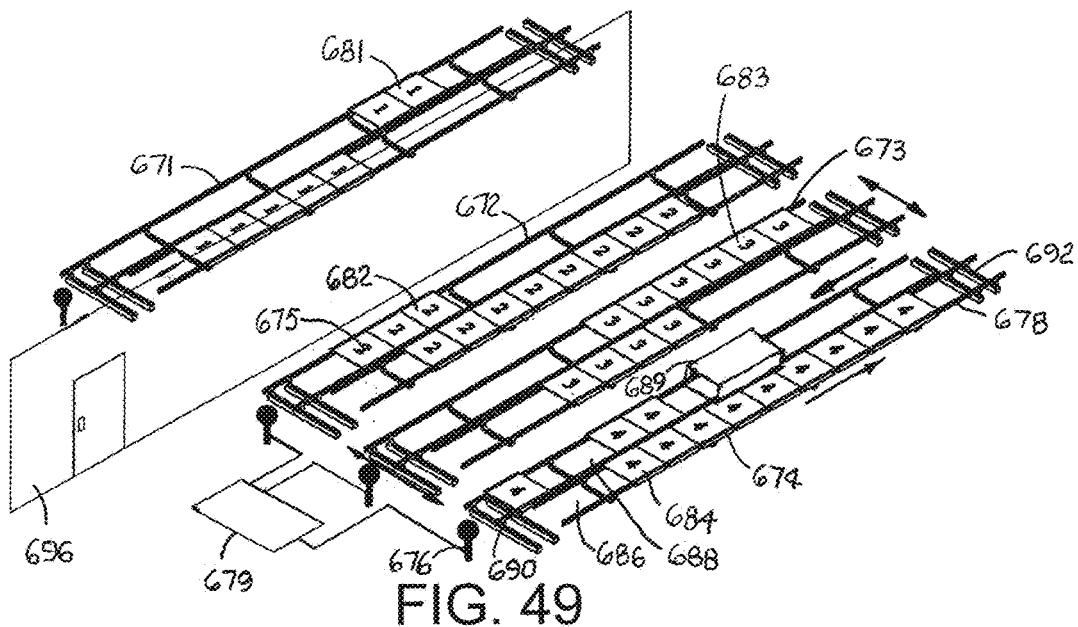
FIG. 49 is an isometric view of a conveyor system constructed of sections of conveyor segments as in FIG. 1 configured for preventing cross contamination of products through the use of dedicated trays.

In some applications, it's important that trays used to transport certain products not be used to transport other products. This is especially true where cross-contamination is unacceptable. One way to avoid cross-contamination by preventing trays for one product from being used for another product is shown in FIG. 49. Four separate conveyor lines 671, 672, 673, 674 are shown. Each conveyor line is dedicated to an individual product type or family, and the trays 681, 682, 683, 684 bear identification as acceptable carriers for an individual product type or family. So each tray is an assigned member of one of a number of families that can be determined from the identification. The identification may be anything that can be detected by a sensor 676 positioned at a sensing position alongside the conveyor or embedded within the conveyor stator rails 678. Examples of identifiable indicia 675 include tray shape, tray color, tray markings, bar codes, other product codes that can be read by optical sensors or determined by visioning systems, RFID tags readable by RFID readers, and magnet arrangements on the trays that are readable by magnetic sensors. When the sensor 676 detects a tray from a family not assigned to the sensor's conveyor, a local or system controller 679 receiving the sensor signal stops the conveyor and sounds an alarm or displays a warning so that an operator can remove the offending tray.

Other sensors that detect process parameters, such as temperature, may also be used to detect valid process temperature ranges and dwell times. For example, in a tray-washing process, the tray sensor would be used to validate proper wash, rinse, and dry cycles. The process sensors could be in or on the trays themselves or positioned along the conveyor lines where the trays undergo the process.

Each of the conveyor lines 671-674 shown in this example comprises a main conveyor section 686 defining a carryway conveying path on which the trays 681, 682, 683, 684 carry products and a return conveyor section 688 defining a return conveying path on which the trays are empty. The infeed end of the main conveyor section 686 is linked to the discharge end of the return section 688 by an infeed diverter section 690. The discharge end of the main conveyor section 686 is linked to the infeed end of the return section 688 by a discharge diverter section 692. The diverter sections 690, 692 may be the same as those shown in FIGS. 14A-14C.

The description of the operation of the fourth conveyor line 674 exemplifies how each of the other conveyor lines 671-673 operates. The trays 684 of the family assigned to the predetermined process to be carried out along the main conveyor section 686 are fed onto the main conveyor section from the return conveyor section 688 by the infeed diverter 690. Only those trays 684 passing the sensor 676 that are identified by the controller 679 as dedicated to the fourth conveyor line 674 are passed onto the main conveyor section 686. After the trays 684 complete their processing on the main conveyor section 686 and their products are removed, they may be diverted by the discharge diverter 692 back to the return conveyor section 688 or diverted elsewhere for cleaning. Cleaned trays can be returned to the return conveyor section 688. Or the cleaning process can be carried out automatically along the return conveyor section 688 in one or more enclosed automatic washing stations 689. In all the tray-conveyor versions described in this application, fully automatic washing-station enclosures 689 can be installed on the return sections in one or more cleaning zones to clean the empty trays as a substitute for manual tray removal and cleaning. Or the washing stations in the cleaning zones can be completely manual or semi-automatic and require some complementary human activity. Washing stations in the return sections of the multiple-stator conveyor systems described could also be used in single-stator tray conveyors.

Figure 50:
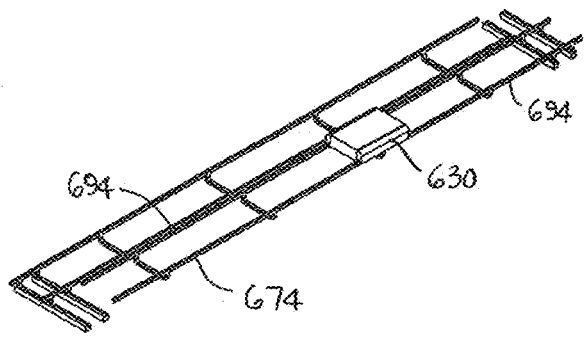
FIG. 50 is an isometric view of a rail scrubber as in FIG. 48 cleaning a conveyor section as in FIG. 49.

If it's necessary or required that the conveyor sections 686, 688, 690, 692 be cleaned upon completion of a process or upon the detection of an unacceptable conveyor tray, all the trays 674 are removed and sequestered for cleaning, for example, and a scrubber 630 is placed on the conveyor line 674 as shown in FIG. 50. The scrubber 630 runs along all the conveyor sections 686, 688, 690, 692 to remove residue from the rails 694. After the scrubber 630 has cleaned the rails 694, it is removed from the conveyor line 674. The sequestered trays 684 can then be put back on the conveyor line 674, typically on the return conveyor section 688. Cleaning of the rails can also be required whenever an inappropriate tray is detected.

Alternatively, the conveyor line 674 can be used for a different process or for the same process on different products. If contamination from the products or by-products of the previous process run is unacceptable, a different family of identifiable trays specific to the process being run is used. For example, to avoid contamination with allergens such as those associated with peanuts, a peanut-processing run could be followed by a subsequent process run on a different food product. The local or system controller 679, based on the sensor signals, passes process- or product-specific trays of a predetermined family and locks out trays of other families dedicated to other processes or products. In a similar way as shown in FIG. 49, the four conveyor lines 671-674 could be dedicated to four different products or processes 1-4 with corresponding designated conveyor trays 681-684. The local or system controller, upon identifying a tray with the sensor 676, would lock out disallowed trays. In that way contamination is avoided. For sensitive processes, such as in the chemical, biomedical, pharmaceutical, food, and electronics industries, different processes have to be separated by a barrier, such as a wall 696, into different zones. The method just described applies as well to those circumstances.

Another way to prevent cross-contamination is to make the trays so that only trays of a certain family are geometrically or drivably compatible with a conveyor. For example, conveyors for a certain process could have a rail gauge that fits only trays of a certain family. Or the stators could be positioned in the conveyor sections so that they align only with the translators in the trays of a certain family.

Figure 51A:
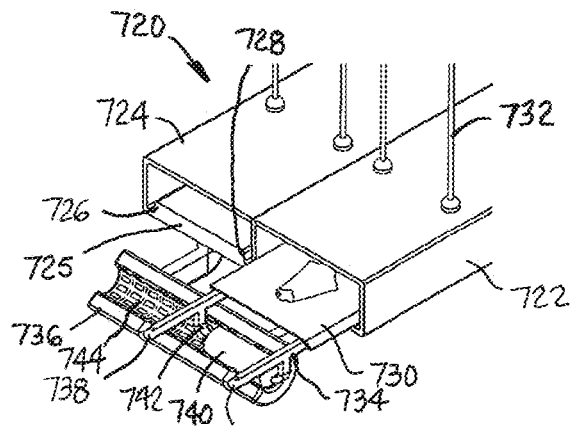
FIGS. 51A and 51B are isometric views of a discharge end of a pipe conveyor and its same-level return embodying features of the invention including a tilt carriage shown in horizontal and tilted positions.
Figure 51B:
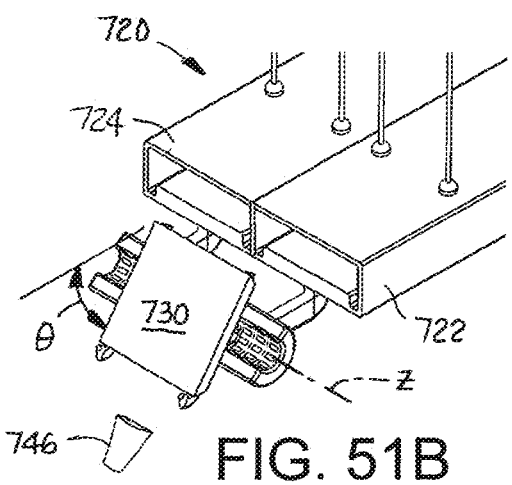

An overhead pipe conveyor with a same-level return is shown in FIGS. 51A and 51B. The pipe conveyor 720 comprises two elongated enclosures, or pipes 722, 724 parallel to each other at the same level and open at opposite ends. Stators (not shown) extend along a conveying surface, in this case, the inner bottom floor 725 of the pipes 722, 724 at left and right sides 726, 728 of the floor to propel the conveyor trays 730 like those in FIG. 7. The pipes 722, 724 may be suspended from above by attachments 732, such as cables or rods. The two pipes 722, 724 are open at a discharge end of the infeed pipe 722 and the re-entry end of the return pipe 724. A carriage assembly comprises a tiltable carriage 734 and a guide track 736 in the form of a partial cylinder along which the carriage translates. The carriage 734 has a pair of left and right stator rails 738 joined through a rotor-translator 740 by a pair of depending arms 742 affixed to the rotor-translator. A θ-z stator 744 is positioned along the inner side of the cylindrical guide track 736. The θ-z stator 744 produces a magnetic flux wave that travels circumferentially (in θ) along the guide track 736 to tilt the tray 730 about a tilt axis as shown in FIG. 51B a predetermined angle θ relative to horizontal (as in FIG. 51A) to discharge articles 746. Magnets or ferrous materials in the carriage rails 738 and in the trays 730 attract each other enough to prevent the trays from sliding off the carriage when it tilts. The stator 744 also propagates a magnetic flux wave axially (in z) along the guide track 736 to translate the carriage 734 from a first position in line with the infeed pipe 722 to a second position in line with the return pipe 724. In that way trays 730 can be returned. So the carriage 734 translates along its tilt axis.

Figure 52A:
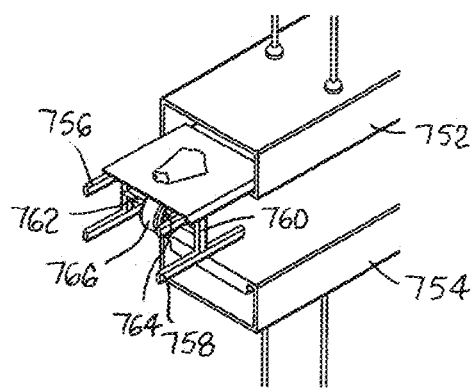
FIGS. 52A-C are isometric views of a discharge end of a pipe conveyor and a lower-level return embodying features of the invention with another version of a tilt carriage.
Figure 52B:
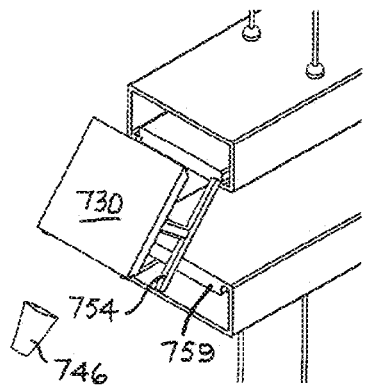
Figure 52C:
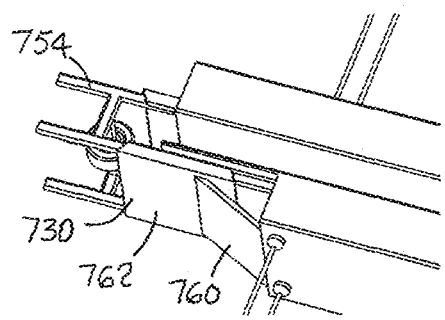

An over-and-under pipe conveyor is shown in FIGS. 52A-52C. In this version a return pipe 750 is below an incoming pipe 752. A carriage assembly has a circulating carriage 754 with two pairs of parallel stator rails 756, 758 joined by arms 760. Shaft segments 762 parallel to the rails 756, 758 join the arms 760 to a rotor 764. An outer stator 766 rotates the rotor 764 and the stator rails 756, 758 a predetermined angle of 180° to alternately position the stator rails in line with the upper and the lower pipes 752, 754. When the carriage 754 tilts, as in FIG. 52B, articles 746 drop from the tray 730. When the carriage 754 completes its 180° rotation, both sets of carriage stator rails 756, 758 are aligned with the upper and lower pipes 752, 754 because the two pairs of rails are rotationally separated by 180°. The stator rails are energized to induct trays 730 onto the upper rails 756 for the upper pipe 752 and to return trays onto the lower rails 758 for the upside-down return trip. The ceiling 759 of the pipe 754 forms the conveying surface in the upside-down return. A scraper 760 attached to the open end of the lower return pipe 760 is positioned to scrape debris sticking to the article-supporting surface 762 of the upside-down tray 730 as it's propelled along the carriage 754. The upside-down trays 730 are prevented from falling off the carriage 754 by magnets and ferrous elements as with the other conveyors just described.

Figure 53:
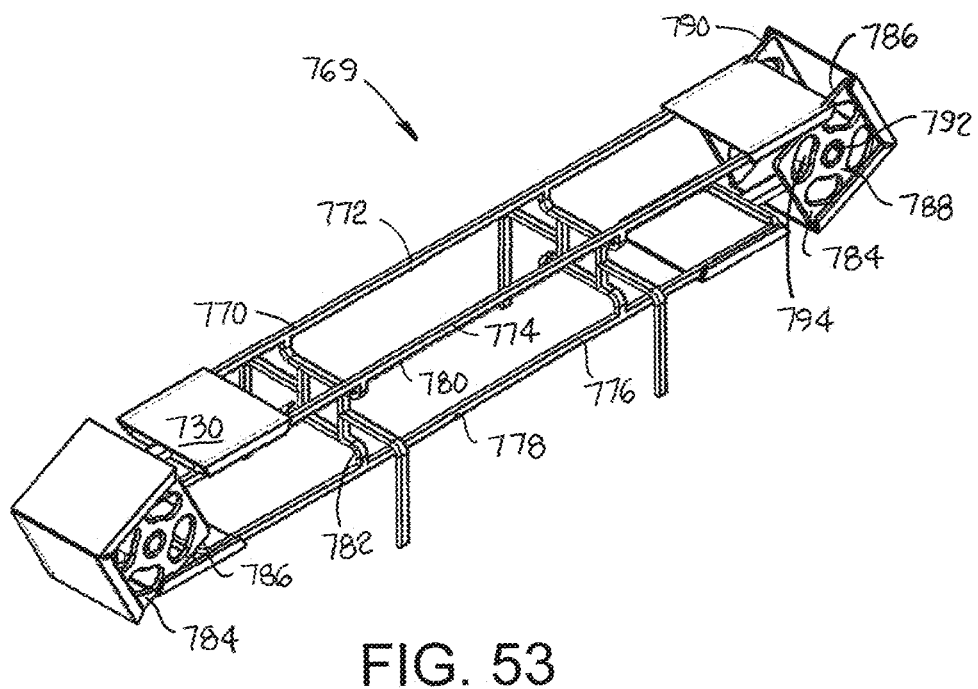
FIG. 53 is an isometric drawing of a conveyor section with lower return and a rotary reversing carriage at each end to form an endless loop embodying features of the invention.

An endless conveyor 769 having an upper carryway and a lower returnway is shown in FIG. 53. The upper carryway 770 has a pair of stator rails 772, 774, like those in FIG. 1, propelling trays 730, like those in FIG. 7. The lower returnway 776 has a pair of upside-down stator rails 778, 780. Both the carryway 772 and the returnway are supported in the same frame 782 in this example. Rotating carriages 784 in carriage assemblies at both ends of the conveyor transfer trays 730 between the carryway 770 and the returnway 776 to form an endless conveying path. Each carriage 784 has four pairs of parallel stator rails 786. The four right-side rails define a right-side square 788 and the four left-side rails define a left-side square 790. The squares 788, 790 are joined by a shaft 792 to a motor 794. The motor rotates the carriage 784 in predetermined 90° increments so that it stops with one of the four pairs of rails 786 aligned with the carryway 770 and the opposite pair of rails aligned with the returnway 776. The stator rails 786 aligned with the carryway 770 and the returnway are activated to discharge a tray 730 onto the carryway and to induct a tray from the returnway. Attracted magnetic and ferrous material in the carriage and returnway rails 786, 778, 780 and in the trays 730 prevent the upside-down or tilted trays from falling. A carriage like the carriage 754 in FIGS. 52A-52C can be used with the conveyor of FIG. 53, and vice versa.

Figure 60:
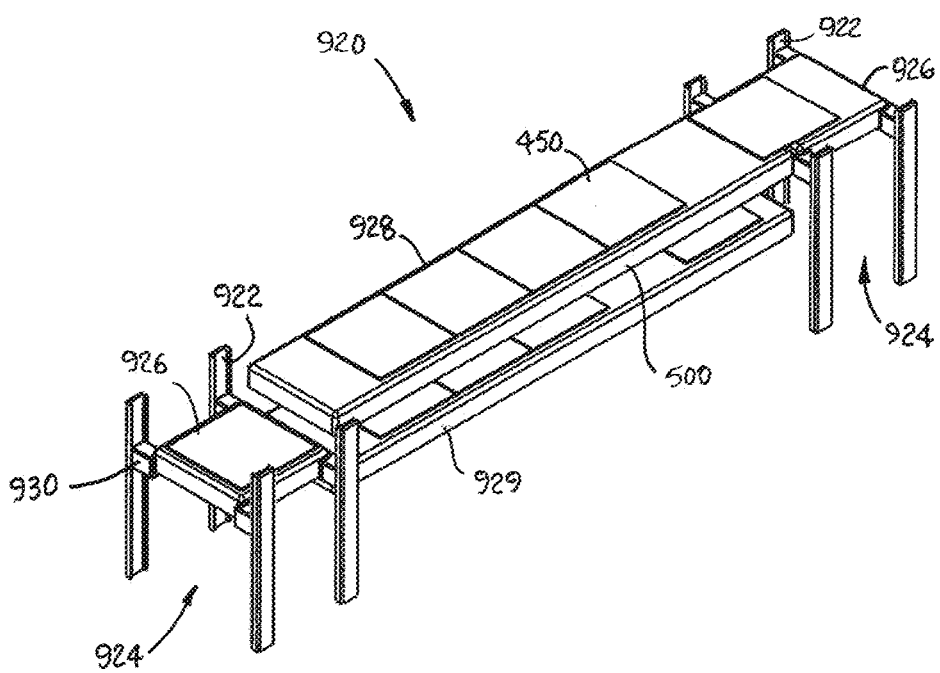
FIG. 60 is an isometric view of an endless conveyor made of conveyor segments as in FIG. 34 with elevator carriages at each end.

An endless conveyor 920 for conveyor segments 500 as in FIG. 33 and skirtless trays 450 as in FIG. 29A is shown in FIG. 60. Conveyor stators along four vertical guide tracks 922 form an elevator 924 at opposite ends of the conveyor 902. Each elevator raises and lowers a carriage 926 to transfer a tray 450 between an upper tray carryway 928 and a lower tray returnway 929. The carriage's embedded stators induct a tray 450 from the carryway or the returnway onto the carriage 926. The carriage stators are then de-energized while the elevator 924 raises or lowers the carriage and the supported tray. Once the carriage 926 is aligned with the carryway 928 or the returnway 929, the carriage stators are re-energized with the opposite phasing to propel the tray 450 off and onto the carryway or returnway. The elevator 924 then lowers or raises the carriage 926 in position to receive the next tray 450. The carriage 926 is similar to the carriage 558 of FIG. 41, but using only single-axis vertical translators in translator housings 930 at each corner. The translator housings 930 ride in the guide tracks 922. Both the carryway 928 and the returnway 929 are constructed of one or more of the conveyor segments 500 providing levitating tray guides for the conveyor trays 450.

What is claimed is:

1. A conveyor system comprising:
   a plurality of conveyor sections, each conveyor section comprising:
      a tray guide extending in length from a rear end to a front end of the conveyor section and in width from a left side to a right side of the conveyor section;
      at least one linear stator extending in length through the tray guide between the rear end and the front end;
   a plurality of conveyor trays having at least one translator forming a linear motor with the at least one linear stator to drive the conveyor trays along the tray guide in the conveying direction;
   wherein the plurality of conveyor sections are each arranged to form a carryway path along which the trays can carry articles and a return path along which empty trays return to the carryway path;
   a scrubber including:
      front and rear wheels riding along the tray guides;
      left and right scrubbing wheels engaging the tray guides;
      a fluid tank;
      nozzles positioned to spray fluid from the fluid tank onto the tray guides;
      a drive system driving the scrubber along the tray guides to clean the conveyor sections.

2. A conveyor system as in claim 1 wherein the tray guide comprises left and right conveyor rails; and
   wherein the front and rear wheels of the scrubber ride along the left and right conveyor rails;
   wherein the left and right scrubbing wheels have brushes engaging the left and right conveyor rails;
   wherein the nozzles are positioned at the left and right conveyor rails to spray fluid from the fluid tank onto the left and right conveyor rails;
   wherein the drive system drives the scrubber along the left and right conveyor rails.

3. A conveyor system as in claim 2 further comprising at least one motor coupled to the front and rear wheels to form the drive system and coupled to the left and right scrubbing wheels to rotate the scrubbing wheels.

4. A conveyor system as in claim 3 further comprising a battery powering the at least one motor.

5. A conveyor system as in claim 2 further comprising a translator forming a linear motor with the at least one stator to drive the scrubber along the left and right conveyor rails.

6. A conveyor system as in claim 2 further comprising a cover covering the fluid tank, the left and right scrubbing wheels, the front and rear wheels, the nozzles, and the drive system and having a front end and rail scrapers extending outward of the front end to scrape debris from the left and right conveyor rails.

7. A conveyor system as in claim 1 wherein the tray guide includes a top surface of the conveyor and;
wherein the front and rear wheels of the scrubber ride along the top surface of the conveyor;
wherein the left and right scrubbing wheels have brushes engaging the top surface of the conveyor;
wherein the nozzles are positioned to spray fluid from the fluid tank onto the top surface of the conveyor;
wherein the drive system drives the scrubber along the top surface of the conveyor.

8. A conveyor system as in claim 7 further comprising at least one motor coupled to the front and rear wheels to form the drive system and coupled to the left and right scrubbing wheels to rotate the scrubbing wheels about an axis perpendicular to the top surface of the conveyor.

9. A conveyor system as in claim 8 further comprising a battery powering the at least one motor.

10. A conveyor system as in claim 7 further comprising a translator forming a linear motor with a stator in the conveyor to drive the scrubber along the top surface of the conveyor.

11. A conveyor system comprising:
a plurality of conveyor sections, each conveyor section comprising:
a tray guide extending in length from a rear end to a front end of the conveyor section and in width from a left side to a right side of the conveyor section;
at least one linear stator extending in length through the tray guide between the rear end and the front end;
a plurality of conveyor trays each including:
at least one translator forming a linear motor with the at least one linear stator to drive the conveyor trays along the tray guide in the conveying direction; and
indicia indicating a family of which the conveyor tray is a member;
wherein the plurality of conveyor sections are arranged to form a carryway path along which the trays can carry articles and a return path along which empty trays return to the carryway path;
wherein each of the conveyor sections conveys only conveyor trays that belong to a predetermined family;
a controller;
a sensor sensing the indicia and sending a sensor signal to the controller;
wherein the controller determines the family of each of the conveyor trays from the sensor signal and prevents the conveyance of the conveyor tray on the conveyor section if the family of the conveyor tray does not match the predetermined family.

12. A conveyor system as in claim 11 wherein the conveyor system comprises one or more cleaning zones along the return path for cleaning the trays and wherein at least one of the one or more cleaning zones includes an automatic washing enclosure in which the conveyor trays are cleaned.

13. A conveyor system as in claim 11 further comprising a scrubber that rides along the tray guide to clean the conveyor section.

14. A conveyor system as in claim 11 wherein the conveyor system comprises one or more cleaning zones along each the return path for cleaning the trays.

15. A conveyor system comprising:
a plurality of conveyor sections, each conveyor section comprising:
a tray guide extending in length from a rear end to a front end of the conveyor section and in width from a left side to a right side of the conveyor section;
at least one linear stator extending in length through the tray guide between the rear end and the front end;
a plurality of conveyor trays having at least one translator forming a linear motor with the at least one linear stator to drive the conveyor trays along the tray guide in the conveying direction;
wherein the plurality of conveyor sections are each arranged to form a carryway path along which the trays can carry articles and a return path along which empty trays return to the carryway path and wherein the conveyor system comprises one or more cleaning zones along the return path for cleaning the trays;
wherein each of the conveyor trays includes indicia indicating a family of which the conveyor tray is a member;
a controller;
a sensor sensing the indicia and sending a sensor signal to the controller;
wherein each of the conveyor sections conveys only conveyor trays that belong to a predetermined family;
wherein the controller determines the family of each of the conveyor trays from the sensor signal and stops the conveyance of the conveyor tray on the conveyor section if the family of the conveyor tray does not match the predetermined family.

16. A conveyor system comprising:
a plurality of conveyor sections, each conveyor section comprising:
a tray guide extending in length from a rear end to a front end of the conveyor section and in width from a left side to a right side of the conveyor section;
at least one linear stator extending in length through the tray guide between the rear end and the front end;
a plurality of conveyor trays each including:
at least one translator forming a linear motor with the at least one linear stator to drive the conveyor trays along the tray guide in the conveying direction; and
indicia indicating a family of which the conveyor tray is a member;
wherein the plurality of conveyor sections are arranged to form a carryway path along which the trays can carry articles and a return path along which empty trays return to the carryway path;
wherein each of the conveyor sections conveys only conveyor trays that belong to a predetermined family;
wherein each of the conveyor sections is physically compatible with conveyor trays that belong to the predetermined family and physically incompatible with conveyor trays that belong to other families so that incompatible conveyor trays cannot be driven by the conveyor section.

17. A conveyor system as in claim 16 wherein the tray guide for each conveyor section includes rails having a rail gauge that fits only the conveyor trays of the predetermined family and not the conveyor trays of other families.

18. A conveyor system as in claim 16 wherein the at least one linear stator in each conveyor section aligns only with the at least one translator in the conveyor trays of the predetermined family and not with the at least one translator in the conveyor trays of other families.

19. A method for operating a conveyor comprising:
assigning each of a plurality of conveyor trays to one of a plurality of families by indicia indicating the assigned family;
assigning a predetermined family of conveyor trays to a conveyor;
identifying the assigned family of each conveyor tray on the conveyor;
identifying conveyor trays whose family does not match the predetermined family assigned to the conveyor;
preventing the conveyor trays whose family does not match the predetermined family assigned to the conveyor from being conveyed on the conveyor;
conveying the conveyor trays whose family matches the predetermined family along the conveyor through a process.

20. The method of claim 19 comprising removing the conveyor trays whose family does not match the predetermined family assigned to the conveyor from the conveyor.

21. The method of claim 19 further comprising:
removing all the conveyor trays from the conveyor when the process is completed or when a conveyor tray whose family does not match the predetermined family assigned to the conveyor is detected;
cleaning the conveyor before conveyor trays are replaced on the conveyor.

* * * * *